(12) United States Patent
Vagell et al.

(10) Patent No.: US 9,348,803 B2
(45) Date of Patent: May 24, 2016

(54) SYSTEMS AND METHODS FOR PROVIDING JUST-IN-TIME PREVIEW OF SUGGESTION RESOLUTIONS

(71) Applicant: Google Inc., Mountain View, CA (US)

(72) Inventors: Vance Julius Vagell, Kew Gardens, NY (US); Ian Gunn, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/060,059

(22) Filed: Oct. 22, 2013

(65) Prior Publication Data

US 2015/0113390 A1 Apr. 23, 2015

(51) Int. Cl.
*G06F 17/24* (2006.01)
*G06F 17/21* (2006.01)

(52) U.S. Cl.
CPC .............. *G06F 17/24* (2013.01); *G06F 17/212* (2013.01)

(58) Field of Classification Search
CPC ............................... G06F 17/24; G06F 17/212
USPC .......................................... 715/255; 707/608
See application file for complete search history.

(56) References Cited

U.S. PATENT DOCUMENTS

| | | |
|---|---|---|
| 4,889,439 A | 12/1989 | Cook et al. |
| 5,111,397 A | 5/1992 | Chirokas et al. |
| 5,142,674 A | 8/1992 | Barker et al. |
| 5,146,552 A | 9/1992 | Cassorla et al. |
| 5,231,577 A | 7/1993 | Koss |
| 5,381,523 A | 1/1995 | Hayashi |
| 5,408,470 A | 4/1995 | Rothrock et al. |
| 5,557,722 A | 9/1996 | DeRose et al. |
| 5,600,775 A | 2/1997 | King et al. |
| 5,675,788 A | 10/1997 | Husick et al. |
| 5,694,609 A | 12/1997 | Murata |
| 5,708,826 A | 1/1998 | Ikeda et al. |
| 5,758,358 A | 5/1998 | Ebbo |
| 5,761,669 A | 6/1998 | Montague et al. |
| 5,793,966 A | 8/1998 | Amstein et al. |
| 5,799,325 A | 8/1998 | Rivette et al. |

(Continued)

FOREIGN PATENT DOCUMENTS

| | | |
|---|---|---|
| KR | 2010-0137323 A | 12/2010 |
| KR | 2012-0010397 | 2/2012 |

OTHER PUBLICATIONS

Camarda, Bill. "Special Edition Using Microsoft Office Word 2003". Dec. 12, 2003, Que.*

(Continued)

*Primary Examiner* — Cesar Paula
*Assistant Examiner* — Tyler J Schallhorn
(74) *Attorney, Agent, or Firm* — Ropes & Gray LLP

(57) ABSTRACT

Systems and methods are disclosed herein for providing a preview of an editor action related to a suggested edit of an electronic document. A first user provides a suggested edit to the electronic document, and the suggested edit to the electronic document is displayed to a second user of the electronic document. The second user provides a user input that is indicative of a desire to preview a result of the editor action on the suggested edit, such as an acceptance or a rejection of the suggested edit. Then, before the second user performs the editor action, a preview of the result of the editor action is provided to the second user in response to detecting the user input.

20 Claims, 15 Drawing Sheets

(56) References Cited

U.S. PATENT DOCUMENTS

| | | |
|---|---|---|
| 5,819,304 A | 10/1998 | Nilsen et al. |
| 5,860,073 A | 1/1999 | Ferrel et al. |
| 5,890,177 A | 3/1999 | Moody et al. |
| 5,895,476 A | 4/1999 | Orr et al. |
| 6,025,836 A | 2/2000 | McBride |
| 6,049,664 A | 4/2000 | Dale et al. |
| 6,061,697 A | 5/2000 | Nakao |
| 6,065,026 A * | 5/2000 | Cornelia et al. ............... 715/202 |
| 6,067,551 A * | 5/2000 | Brown et al. |
| 6,073,144 A | 6/2000 | van Hoff |
| 6,169,999 B1 | 1/2001 | Kanno |
| 6,173,317 B1 | 1/2001 | Chaddha et al. |
| 6,212,549 B1 | 4/2001 | Page et al. |
| 6,243,706 B1 | 6/2001 | Moreau et al. |
| 6,327,584 B1 | 12/2001 | Xian et al. |
| 6,341,305 B2 | 1/2002 | Wolfe |
| 6,349,308 B1 | 2/2002 | Whang et al. |
| 6,349,314 B1 | 2/2002 | Patel |
| 6,377,957 B1 | 4/2002 | Jeyaraman |
| 6,377,993 B1 | 4/2002 | Brandt et al. |
| 6,418,441 B1 | 7/2002 | Call |
| 6,438,564 B1 | 8/2002 | Morton et al. |
| 6,501,779 B1 | 12/2002 | McLaughlin et al. |
| 6,532,218 B1 | 3/2003 | Shaffer et al. |
| 6,551,357 B1 | 4/2003 | Madduri |
| 6,584,479 B2 | 6/2003 | Chang ................... G06F 17/211 715/205 |
| 6,662,210 B1 | 12/2003 | Carleton et al. |
| 6,665,835 B1 | 12/2003 | Gutfreund et al. |
| 6,687,878 B1 | 2/2004 | Eintracht et al. |
| 6,691,126 B1 | 2/2004 | Syeda-Mahmood |
| 6,697,569 B1 | 2/2004 | Gomez et al. |
| 6,717,593 B1 | 4/2004 | Jennings |
| 6,728,753 B1 | 4/2004 | Parasnis et al. |
| 6,731,309 B1 | 5/2004 | Unbedacht et al. |
| 6,760,749 B1 | 7/2004 | Dunlap et al. |
| 6,766,333 B1 | 7/2004 | Wu et al. |
| 6,771,291 B1 | 8/2004 | DiStefano, III |
| 6,865,713 B1 | 3/2005 | Bates et al. |
| 6,879,997 B1 * | 4/2005 | Ketola et al. ................... 709/208 |
| 6,904,561 B1 | 6/2005 | Faraday et al. |
| 6,912,726 B1 | 6/2005 | Chen et al. |
| 6,983,416 B1 | 1/2006 | Bae et al. |
| 6,988,241 B1 | 1/2006 | Guttman et al. |
| 7,017,112 B2 | 3/2006 | Collie et al. |
| 7,031,954 B1 | 4/2006 | Kirsch |
| 7,035,910 B1 | 4/2006 | Dutta et al. |
| 7,039,643 B2 | 5/2006 | Sena et al. |
| 7,069,502 B2 | 6/2006 | Numata et al. |
| 7,106,469 B2 | 9/2006 | Simpson et al. |
| 7,143,177 B1 | 11/2006 | Johnson et al. |
| 7,149,957 B2 | 12/2006 | Hull et al. |
| 7,149,973 B2 | 12/2006 | Dias et al. |
| 7,162,693 B2 | 1/2007 | Yamanaka et al. |
| 7,197,510 B2 | 3/2007 | Abe et al. |
| 7,206,773 B2 | 4/2007 | Erol et al. |
| 7,213,199 B2 | 5/2007 | Humenansky et al. |
| 7,233,951 B1 | 6/2007 | Gainer et al. |
| 7,263,497 B1 | 8/2007 | Wiser et al. |
| 7,263,688 B2 | 8/2007 | Pitzel et al. |
| 7,266,568 B1 | 9/2007 | Erol et al. |
| 7,284,199 B2 | 10/2007 | Parasnis et al. |
| 7,287,094 B2 | 10/2007 | Mogul |
| 7,299,404 B2 | 11/2007 | Agarwal et al. |
| 7,305,613 B2 | 12/2007 | Oezgen |
| 7,325,187 B2 | 1/2008 | Yashiro |
| 7,330,875 B1 | 2/2008 | Parasnis et al. |
| 7,350,142 B2 | 3/2008 | Kraft et al. |
| 7,409,633 B2 | 8/2008 | Lerner et al. |
| 7,418,656 B1 | 8/2008 | Petersen |
| 7,424,670 B2 | 9/2008 | Burke et al. |
| 7,432,938 B1 | 10/2008 | Reuter et al. |
| 7,437,421 B2 | 10/2008 | Bhogal et al. |
| 7,478,330 B1 | 1/2009 | Branson et al. |
| 7,487,448 B2 | 2/2009 | Emerson et al. |
| 7,491,399 B2 | 2/2009 | Vakharia |
| 7,506,242 B2 | 3/2009 | Kotler et al. |
| 7,529,778 B1 | 5/2009 | Dewey et al. |
| 7,559,017 B2 | 7/2009 | Datar et al. |
| 7,634,728 B2 | 12/2009 | Kraft |
| 7,656,543 B2 | 2/2010 | Atkins |
| 7,667,862 B2 | 2/2010 | Ziegler et al. |
| 7,680,932 B2 | 3/2010 | Defaix et al. |
| 7,698,379 B2 | 4/2010 | Dutta et al. |
| 7,707,413 B2 | 4/2010 | Lunt et al. |
| 7,711,835 B2 | 5/2010 | Braddy et al. |
| 7,712,016 B2 | 5/2010 | Jones et al. |
| 7,734,914 B1 | 6/2010 | Malasky |
| 7,735,101 B2 | 6/2010 | Lanza et al. |
| 7,739,255 B2 | 6/2010 | Hengel et al. |
| 7,743,331 B1 | 6/2010 | Fleischer et al. |
| 7,761,796 B2 | 7/2010 | Faraday et al. |
| 7,769,810 B1 | 8/2010 | Kaufman |
| 7,774,703 B2 | 8/2010 | Junuzovic et al. |
| 7,779,113 B1 | 8/2010 | Samar |
| 7,779,347 B2 | 8/2010 | Christiansen et al. |
| 7,792,788 B2 | 9/2010 | Melmon et al. |
| 7,818,678 B2 | 10/2010 | Massand |
| 7,818,679 B2 | 10/2010 | Clarke |
| 7,823,058 B2 | 10/2010 | Pea et al. |
| 7,836,148 B2 | 11/2010 | Popp et al. |
| 7,865,816 B2 | 1/2011 | Tanaka |
| 7,890,405 B1 | 2/2011 | Robb |
| 7,890,928 B2 | 2/2011 | Patrudu |
| 7,920,894 B2 | 4/2011 | Wyler |
| 7,937,663 B2 | 5/2011 | Parker et al. |
| 7,941,399 B2 | 5/2011 | Bailor et al. |
| 7,941,419 B2 | 5/2011 | Bhatkar et al. |
| 7,941,444 B2 | 5/2011 | Cragun et al. |
| 7,962,853 B2 | 6/2011 | Bedi et al. |
| 7,966,556 B1 | 6/2011 | Bourdev |
| 7,975,223 B2 * | 7/2011 | Plumley et al. ................ 715/255 |
| 7,982,747 B1 * | 7/2011 | Dulaney et al. ................ 345/619 |
| 7,986,298 B1 * | 7/2011 | Dulaney et al. ................ 345/156 |
| 7,996,380 B2 | 8/2011 | Arrouye et al. |
| 7,996,446 B2 | 8/2011 | Bacon et al. |
| 8,015,496 B1 | 9/2011 | Rogers |
| 8,019,780 B1 | 9/2011 | Pinkerton et al. |
| 8,073,812 B2 | 12/2011 | Curtis |
| 8,086,960 B1 * | 12/2011 | Gopalakrishna et al. ..... 715/266 |
| 8,108,427 B2 | 1/2012 | Prahlad et al. |
| 8,116,569 B2 | 2/2012 | Markiewicz et al. |
| 8,131,723 B2 | 3/2012 | Sim-Tang |
| 8,151,204 B2 | 4/2012 | Lusen et al. |
| 8,184,811 B1 | 5/2012 | Patten et al. |
| 8,190,987 B2 | 5/2012 | Campbell et al. |
| 8,225,274 B2 | 7/2012 | Cowtan |
| 8,250,455 B2 | 8/2012 | Kadowaki et al. |
| 8,266,534 B2 | 9/2012 | Curtis et al. |
| 8,275,974 B2 | 9/2012 | Voshell |
| 8,281,023 B2 | 10/2012 | Dondeti et al. |
| 8,296,647 B1 | 10/2012 | Bourdev ............. G06F 17/2288 715/229 |
| 8,327,127 B2 | 12/2012 | Suryanarayana et al. |
| 8,332,815 B2 | 12/2012 | Balfe et al. |
| 8,341,708 B1 | 12/2012 | Eatough et al. |
| 8,352,870 B2 * | 1/2013 | Bailor et al. ................... 715/751 |
| 8,364,759 B2 | 1/2013 | Moromisato et al. |
| 8,386,478 B2 | 2/2013 | Wang |
| 8,417,666 B2 * | 4/2013 | Bailor et al. ................... 707/608 |
| 8,418,051 B1 | 4/2013 | Bourdev ............. G06F 17/241 715/229 |
| 8,453,052 B1 * | 5/2013 | Newman et al. ............... 715/255 |
| 8,478,817 B2 | 7/2013 | Duggal |
| 8,682,989 B2 | 3/2014 | Meisels et al. |
| 8,700,986 B1 | 4/2014 | Pereira et al. |
| 8,943,399 B2 | 1/2015 | Pereira et al. |
| 2001/0037346 A1 | 11/2001 | Johnson |
| 2002/0032701 A1 | 3/2002 | Gao et al. |
| 2002/0035580 A1 | 3/2002 | Tanabe |
| 2002/0051185 A1 | 5/2002 | Yamaguchi et al. |
| 2002/0065848 A1 | 5/2002 | Walker et al. |
| 2002/0133492 A1 | 9/2002 | Goldstein et al. |
| 2002/0143691 A1 | 10/2002 | Ramaley et al. |

(56) References Cited

U.S. PATENT DOCUMENTS

| | | |
|---|---|---|
| 2002/0161797 A1 | 10/2002 | Gallo et al. |
| 2002/0162118 A1 | 10/2002 | Levy et al. |
| 2002/0174085 A1 | 11/2002 | Nelson et al. |
| 2002/0174224 A1 | 11/2002 | Scheifler et al. |
| 2002/0194302 A1 | 12/2002 | Blumberg |
| 2003/0014406 A1 | 1/2003 | Faieta et al. |
| 2003/0037076 A1 | 2/2003 | Bravery et al. |
| 2003/0037303 A1 | 2/2003 | Bodlaender et al. |
| 2003/0061280 A1 | 3/2003 | Bulson et al. |
| 2003/0084078 A1 | 5/2003 | Torii et al. |
| 2003/0105719 A1 | 6/2003 | Berger et al. |
| 2003/0126592 A1 | 7/2003 | Mishra et al. |
| 2003/0145279 A1 | 7/2003 | Bourbakis et al. |
| 2003/0222890 A1 | 12/2003 | Salesin et al. |
| 2004/0019595 A1 | 1/2004 | Bhogal et al. |
| 2004/0044965 A1 | 3/2004 | Toyama et al. |
| 2004/0085354 A1 | 5/2004 | Massand |
| 2004/0088653 A1 | 5/2004 | Bell et al. |
| 2004/0103141 A1 | 5/2004 | Miller et al. |
| 2004/0133444 A1 | 7/2004 | Defaix et al. |
| 2004/0133639 A1 | 7/2004 | Shuang et al. |
| 2004/0201633 A1 | 10/2004 | Barsness et al. |
| 2004/0205358 A1 | 10/2004 | Erickson |
| 2004/0205477 A1 | 10/2004 | Lin |
| 2004/0210833 A1 | 10/2004 | Lerner et al. |
| 2004/0215672 A1 | 10/2004 | Pfitzner |
| 2004/0215825 A1 | 10/2004 | Pfitzner |
| 2004/0215826 A1 | 10/2004 | Pfitzner |
| 2004/0216090 A1 | 10/2004 | Kaler et al. |
| 2004/0248612 A1 | 12/2004 | Lee et al. |
| 2004/0255005 A1 | 12/2004 | Spooner |
| 2004/0255337 A1 | 12/2004 | Doyle et al. |
| 2004/0260594 A1 | 12/2004 | Maddox |
| 2004/0260714 A1 | 12/2004 | Chatterjee et al. |
| 2005/0055337 A1 | 3/2005 | Bebo et al. |
| 2005/0091291 A1 | 4/2005 | Kaler et al. |
| 2005/0125461 A1 | 6/2005 | Filz |
| 2005/0131887 A1 | 6/2005 | Rohrabaugh et al. |
| 2005/0144256 A1 | 6/2005 | Blumberg |
| 2005/0160355 A1 | 7/2005 | Cragun et al. |
| 2005/0160356 A1 | 7/2005 | Albornoz et al. |
| 2005/0160357 A1 | 7/2005 | Rivette et al. |
| 2005/0160368 A1 | 7/2005 | Liu et al. |
| 2005/0182650 A1 | 8/2005 | Maddox et al. |
| 2005/0185636 A1 | 8/2005 | Bucher |
| 2005/0200896 A1 | 9/2005 | Narusawa et al. |
| 2005/0223315 A1 | 10/2005 | Shimizu et al. |
| 2005/0234943 A1* | 10/2005 | Clarke .......................... 707/100 |
| 2005/0243760 A1 | 11/2005 | Yoshioka |
| 2005/0268220 A1 | 12/2005 | Tanaka |
| 2005/0273695 A1 | 12/2005 | Schnurr |
| 2005/0289538 A1 | 12/2005 | Black-Ziegelbein et al. |
| 2006/0005168 A1 | 1/2006 | Singh |
| 2006/0031751 A1 | 2/2006 | Ehud |
| 2006/0053194 A1 | 3/2006 | Schneider et al. |
| 2006/0053365 A1 | 3/2006 | Hollander et al. |
| 2006/0070029 A1 | 3/2006 | Laborczfalvi et al. |
| 2006/0075332 A1 | 4/2006 | Fairweather et al. |
| 2006/0080601 A1 | 4/2006 | Weber et al. |
| 2006/0101071 A1 | 5/2006 | Henderson |
| 2006/0101328 A1 | 5/2006 | Albornoz et al. |
| 2006/0123329 A1 | 6/2006 | Steen et al. |
| 2006/0123348 A1 | 6/2006 | Ross et al. |
| 2006/0149795 A1 | 7/2006 | Gillespie et al. |
| 2006/0149831 A1 | 7/2006 | Dutta et al. |
| 2006/0161841 A1 | 7/2006 | Horiuchi et al. |
| 2006/0200755 A1 | 9/2006 | Melmon et al. |
| 2006/0224570 A1 | 10/2006 | Quiroga et al. |
| 2006/0230344 A1 | 10/2006 | Jennings et al. |
| 2006/0248121 A1 | 11/2006 | Cacenco et al. |
| 2006/0282762 A1 | 12/2006 | Diamond et al. |
| 2006/0282778 A1 | 12/2006 | Barsness et al. |
| 2007/0003223 A1 | 1/2007 | Armstrong et al. |
| 2007/0033654 A1 | 2/2007 | Wilson |
| 2007/0047008 A1 | 3/2007 | Graham et al. |
| 2007/0055926 A1 | 3/2007 | Christiansen et al. |
| 2007/0061714 A1* | 3/2007 | Stuple et al. .................. 715/529 |
| 2007/0067182 A1 | 3/2007 | Harp et al. |
| 2007/0070066 A1 | 3/2007 | Bakhash |
| 2007/0073899 A1 | 3/2007 | Judge et al. |
| 2007/0100938 A1 | 5/2007 | Bagley et al. |
| 2007/0118598 A1 | 5/2007 | Bedi et al. |
| 2007/0118794 A1 | 5/2007 | Hollander et al. |
| 2007/0118795 A1 | 5/2007 | Noyes et al. |
| 2007/0174762 A1 | 7/2007 | Plant |
| 2007/0186157 A1 | 8/2007 | Walker et al. |
| 2007/0208992 A1 | 9/2007 | Koren |
| 2007/0220068 A1 | 9/2007 | Thompson et al. |
| 2007/0239695 A1 | 10/2007 | Chakra et al. |
| 2007/0250901 A1 | 10/2007 | McIntire et al. |
| 2007/0254631 A1 | 11/2007 | Spooner |
| 2007/0260677 A1 | 11/2007 | DeMarco et al. |
| 2007/0260996 A1 | 11/2007 | Jakobson |
| 2007/0266325 A1 | 11/2007 | Helm et al. |
| 2007/0271502 A1 | 11/2007 | Bedi et al. |
| 2007/0288637 A1 | 12/2007 | Layton et al. |
| 2008/0028302 A1 | 1/2008 | Meschkat |
| 2008/0034275 A1 | 2/2008 | Edd et al. |
| 2008/0040659 A1 | 2/2008 | Doyle |
| 2008/0046837 A1 | 2/2008 | Beauchamp et al. |
| 2008/0059417 A1 | 3/2008 | Yamada et al. |
| 2008/0059539 A1 | 3/2008 | Chin et al. |
| 2008/0071827 A1 | 3/2008 | Hengel et al. |
| 2008/0082604 A1 | 4/2008 | Mansour et al. |
| 2008/0092066 A1 | 4/2008 | Edlund et al. |
| 2008/0126943 A1 | 5/2008 | Parasnis et al. |
| 2008/0127212 A1 | 5/2008 | Nakamizo et al. |
| 2008/0168073 A1 | 7/2008 | Siegel et al. |
| 2008/0172720 A1 | 7/2008 | Botz et al. |
| 2008/0189361 A1 | 8/2008 | Greschler et al. |
| 2008/0222273 A1 | 9/2008 | Lakshmanan et al. |
| 2008/0229181 A1 | 9/2008 | Jung et al. |
| 2008/0244374 A1 | 10/2008 | Hattori |
| 2008/0263101 A1 | 10/2008 | Hara |
| 2008/0263442 A1* | 10/2008 | Plumley et al. ................ 715/255 |
| 2008/0270406 A1 | 10/2008 | Flavin et al. |
| 2008/0282143 A1 | 11/2008 | Hiyama et al. |
| 2008/0301571 A1 | 12/2008 | Herzog |
| 2009/0006842 A1 | 1/2009 | Ross et al. |
| 2009/0025063 A1* | 1/2009 | Thomas ............................ 726/4 |
| 2009/0049046 A1 | 2/2009 | Godzik et al. |
| 2009/0055755 A1 | 2/2009 | Hicks et al. |
| 2009/0083707 A1 | 3/2009 | Fujita et al. |
| 2009/0089664 A1 | 4/2009 | Wagner et al. |
| 2009/0094086 A1 | 4/2009 | Bruno et al. |
| 2009/0094329 A1 | 4/2009 | Ambati et al. |
| 2009/0099919 A1 | 4/2009 | Schultheiss et al. |
| 2009/0112953 A1 | 4/2009 | Barsness et al. |
| 2009/0112990 A1 | 4/2009 | Campbell et al. |
| 2009/0119572 A1 | 5/2009 | Koivunen |
| 2009/0129596 A1 | 5/2009 | Chavez et al. |
| 2009/0132907 A1 | 5/2009 | Shao et al. |
| 2009/0144616 A1 | 6/2009 | Mori |
| 2009/0157811 A1 | 6/2009 | Bailor et al. |
| 2009/0164620 A1 | 6/2009 | Ziegler et al. |
| 2009/0165128 A1 | 6/2009 | McNally et al. |
| 2009/0192845 A1 | 7/2009 | Gudipaty et al. |
| 2009/0210459 A1* | 8/2009 | Nair et al. ...................... 707/203 |
| 2009/0210721 A1 | 8/2009 | Phillips |
| 2009/0235181 A1 | 9/2009 | Saliba et al. |
| 2009/0235352 A1 | 9/2009 | Schrijen et al. |
| 2009/0249224 A1 | 10/2009 | Davis et al. |
| 2009/0254580 A1 | 10/2009 | Laurion |
| 2009/0254802 A1 | 10/2009 | Campagna et al. |
| 2009/0254840 A1 | 10/2009 | Churchill et al. |
| 2009/0271696 A1* | 10/2009 | Bailor et al. ................... 715/229 |
| 2009/0288135 A1 | 11/2009 | Chang et al. |
| 2009/0292548 A1 | 11/2009 | Van Court |
| 2009/0307585 A1 | 12/2009 | Tranchant et al. |
| 2010/0005398 A1 | 1/2010 | Pratley et al. |
| 2010/0005410 A1 | 1/2010 | Pang |
| 2010/0005529 A1 | 1/2010 | Hemade |
| 2010/0030578 A1 | 2/2010 | Siddique et al. |
| 2010/0031135 A1 | 2/2010 | Naghshin et al. |

(56) References Cited

U.S. PATENT DOCUMENTS

| | | |
|---|---|---|
| 2010/0050089 A1 | 2/2010 | Kim et al. |
| 2010/0070852 A1 | 3/2010 | Li |
| 2010/0077301 A1 | 3/2010 | Bodnick et al. |
| 2010/0083096 A1 | 4/2010 | Dupuis-Latour et al. |
| 2010/0161762 A1 | 6/2010 | Saxena |
| 2010/0199191 A1 | 8/2010 | Takahashi |
| 2010/0205230 A1 | 8/2010 | Simeonov et al. |
| 2010/0205520 A1 | 8/2010 | Parish et al. |
| 2010/0218099 A1 | 8/2010 | van Melle et al. |
| 2010/0229086 A1 | 9/2010 | Howell et al. |
| 2010/0235763 A1 | 9/2010 | Massand |
| 2010/0245256 A1 | 9/2010 | Estrada et al. |
| 2010/0251092 A1 | 9/2010 | Sun |
| 2010/0251122 A1 | 9/2010 | Lee et al. |
| 2010/0257457 A1* | 10/2010 | De Goes .................. 715/751 |
| 2010/0257578 A1 | 10/2010 | Shukla et al. |
| 2010/0262636 A1 | 10/2010 | Bacon et al. |
| 2010/0262659 A1 | 10/2010 | Christiansen et al. |
| 2010/0274910 A1 | 10/2010 | Ghanaie-Sichanie et al. |
| 2010/0278453 A1 | 11/2010 | King |
| 2010/0281076 A1 | 11/2010 | Pan et al. |
| 2010/0281528 A1 | 11/2010 | Hayton et al. |
| 2010/0309436 A1 | 12/2010 | Allen, Jr. et al. |
| 2010/0318894 A1 | 12/2010 | Billharz et al. |
| 2011/0018963 A1 | 1/2011 | Robinson |
| 2011/0035661 A1 | 2/2011 | Balinsky et al. |
| 2011/0055702 A1 | 3/2011 | Jakobson |
| 2011/0060844 A1 | 3/2011 | Allan et al. |
| 2011/0066668 A1 | 3/2011 | Guarraci |
| 2011/0066957 A1 | 3/2011 | Prats et al. |
| 2011/0078246 A1 | 3/2011 | Dittmer-Roche |
| 2011/0085211 A1 | 4/2011 | King et al. |
| 2011/0099093 A1 | 4/2011 | Mills |
| 2011/0137979 A1 | 6/2011 | Seo et al. |
| 2011/0154185 A1 | 6/2011 | Kern et al. |
| 2011/0164043 A1 | 7/2011 | Arora et al. |
| 2011/0179427 A1 | 7/2011 | Krishnamoorthy et al. |
| 2011/0184784 A1 | 7/2011 | Rudow et al. |
| 2011/0202672 A1 | 8/2011 | Narayanaswamy et al. |
| 2011/0209052 A1 | 8/2011 | Parker et al. |
| 2011/0219331 A1 | 9/2011 | DeLuca et al. |
| 2011/0231912 A1 | 9/2011 | Lee et al. |
| 2011/0238663 A1 | 9/2011 | Zhang |
| 2011/0252038 A1 | 10/2011 | Schmidt et al. |
| 2011/0252299 A1 | 10/2011 | Lloyd et al. |
| 2011/0252335 A1 | 10/2011 | Lloyd et al. |
| 2011/0252339 A1 | 10/2011 | Lemonik et al. |
| 2011/0264712 A1 | 10/2011 | Ylonen |
| 2011/0282933 A1 | 11/2011 | Schmier |
| 2011/0295593 A1 | 12/2011 | Raghuveer |
| 2011/0296299 A1 | 12/2011 | Parker |
| 2012/0005159 A1 | 1/2012 | Wang et al. |
| 2012/0036423 A1 | 2/2012 | Haynes, II et al. |
| 2012/0047434 A1* | 2/2012 | Ginetti .................. 715/255 |
| 2012/0072821 A1 | 3/2012 | Bowling ............ G06F 17/24 715/229 |
| 2012/0095878 A1 | 4/2012 | Feldman et al. |
| 2012/0099135 A1 | 4/2012 | Ono |
| 2012/0110445 A1 | 5/2012 | Greenspan et al. |
| 2012/0110646 A1 | 5/2012 | Ajitomi et al. |
| 2012/0117406 A1 | 5/2012 | Eun |
| 2012/0117452 A1 | 5/2012 | Lloyd et al. |
| 2012/0131483 A1 | 5/2012 | Archer et al. |
| 2012/0144202 A1 | 6/2012 | Counterman |
| 2012/0144454 A1 | 6/2012 | Lee |
| 2012/0210210 A1 | 8/2012 | Itoh et al. |
| 2012/0240027 A1 | 9/2012 | Pereira et al. |
| 2012/0254042 A1 | 10/2012 | Ludemann |
| 2012/0266229 A1 | 10/2012 | Simone et al. |
| 2012/0278401 A1 | 11/2012 | Meisels et al. |
| 2013/0036455 A1 | 2/2013 | Bodi et al. |
| 2013/0047072 A1* | 2/2013 | Bailor .................. 715/234 |
| 2013/0086670 A1 | 4/2013 | Vangpat et al. |
| 2013/0097490 A1 | 4/2013 | Kotler et al. |
| 2013/0103387 A1 | 4/2013 | Kinder |
| 2013/0111336 A1 | 5/2013 | Dorman et al. |
| 2013/0124606 A1 | 5/2013 | Carpenter et al. |
| 2013/0262373 A1* | 10/2013 | Rampson ................ 707/608 |
| 2013/0326330 A1* | 12/2013 | Harris et al. ............. 715/234 |
| 2014/0082470 A1* | 3/2014 | Trebas et al. ............ 715/217 |
| 2014/0164255 A1 | 6/2014 | Daly .................. G07C 1/00 705/80 |
| 2014/0165087 A1 | 6/2014 | Smith et al. |

OTHER PUBLICATIONS

International Search Report and Written Opinion dated Mar. 5, 2015 in International Application No. PCT/US2014/058275.

"File:" Microsoft Computer Dictionary; May 1, 2002; Microsoft Press; Fifth Edition; p. 266.

"Google Docs 4 Everyone" http://www.scribd.com/doc/14119795/Google-Docs-4-Everyone Published Feb. 2009 Steven Holzner.

"Googlepedia: The Ultimate Google Resource, Third Edition" pp. 1-24 (pp. 276-287 in original source).

"Simultaneously edit a presentation with other authors," by MicrosoftTM Office: MAC, published Nov. 11, 2010, pp. 1-4.

"Using Adobe Buzzword", 2008, pp. 1-35.

<http://www-archive.mozilla.org/projects/webservice retrieved from the Internet Dec. 13, 2013.

1-3, retrieved from the Internet May 24, 2012: http://code.google.com/p/wave-protocol/source/browse/srcJorg/waveprotocol/wave/client/editor/exampleslimg/MyDoodad.java.

28th International Conference in Human Factors in Computing Systems, Apr. 10, 2010, 683-692.

Beresford et al., "MockDroid: Trading Privacy for Application Functionality on Smartphones," HotMobile '11 Mar01-Mar. 2011, Phoenix, AZ, USA.

Bibi et al., "A Platform for Delivering Multimedia Presentations on Cultural Heritage," 2010 14th Panhellenic Conference on Informatics, pp. 175-179.

Brouwer et al., MathDox editor, Electronic Proceedings MathUI 2009, 2009, XP55028009, retrieved from the Internet May 23, 2012: <http://Www//>win.tue.nl/hansc/mde.pdf.

Cayenne-McCall, "Synchronous 3D Document Collaboration," Pace University, Department of Computer Sciene; Nov. 2008. (42 Pages).

Chevalier et al., "Using Text Animated Transitions to Support Navigation in Document Histories", from "Proceedings of the 28th Annual CHI Conference on Human Factors in Computing Systems", Apr. 10-15, 2010, Association for Computing Machinery.

Chitu,Footnotes in GoogleDocs, Oct. 17, 2008, XP055028085, retrieved from the Internet 5/2412012: http://googlesystem.blogspot.com/2008/10/footnotes-in-google-docs.html.

Cooperative Word (2004) 13, (copyright 2005) ("MAUI").

Dan R. Herrick, Google This! Using Google Apps for Collaboration and Productivity, Proceedings of the ACM SIGUCCS Fall Conference on User Services Conference, SIGUCCS '09, Jan. 1, 2009, 55.

Danilatos, Riche Text Editor- Message dated Jun. 10, 2010 8:57am, Wave Protocol Group Discussion Forum, Jun. 10, 2010, XP055027976, retrieved from the Internet May 23, 2012: https://groups.google.com/group/wave-protocol/browse_thread/threadl73608bf7a13f2385.

Danilatos. Demonstration Doodad, with a few different variations of rendering and interactive behaviour, Dec. 5, 2010,.

De Lara et al., "Puppeteer: Component-Based Adaptation for Mobile Computing," Proceedings of the 3rd USEIX Symposium on Internet Techonologies and Systems, 14 pages (Mar. 27, 2001).

Ellis et al., "Concurrency Control in Groupware Systems," ACM 1989, pp. 399-407.

Ellis et al., Groupware Some Issues and Experiences, Communications of the Association for Computing Machinery, ACM, 34:1, Jan. 1, 1991,38-58.

Frazer, "Differential Synchronization," Google, Munich, Germany (2009) 8 pages.

Gutwin et al., "Improving Network Efficiency in Real-Time Groupware with General Message Compression," University of Saskatchewan, Canada, University of Canterbury, 10 pages, New Zealand (2006).

(56) References Cited

OTHER PUBLICATIONS

Hashemi, "ambigity Resolution by Reording Rules in Text Containing Errors," Association for Computational Linguistics, 62(1):69-70 (2007).
Hearnden, Wave Editor & Document Renders. A talk by Dave Hearnden at teh Wave Summit captured in video on YouTube Nov. 12, 2010, retrieved from the Internet 5123/2012: http:J/youtu.beiEuXApEullzc.
Hodel et al., "Supporting Collaborative Layouting in Word Processing," University of Zurich, Department of Inforamtics; Zurich, Switzerland, 2004 (18 page).
http://web.archive.org/web/20120512130530/https://developer.mozilla.org/en/Setting_up_extension_development_environment.
http://web.archive.org/web/20120819143535/https://addons.mozilla.org/en—US/firefox/extensions/?sort=featured.
http://web.archive.org/web/20121020134710/https://addons.mozilla.org/en—US/seamonkey/extensions.
http://web.archive.org/web/20121021135356/http://support.mozilla.org/en -US/kb/find-and-install-add-ons-add-features-to-firefox.
https://addons.mozilla.org/En-us/seamonkey/addon/gmail-smime/?src=search.
Huang et al., "A General Purpose Virtual Collaboration Room," Google 1999, pp. 1-9.
Ignat et al., "Awareness of Concurrent Changes in Distributed Software Development," Nancy-Universite, France 2008 (9 pages).
Ignat et al.; CoDoc: Multi-mode collaboration over documents, CAiSE (2004); retrieved from the Internet: URL: http://www.springerlink.com/content/mffh585tc0ntcype/fulltext.pdf [retrieved on Jun. 17, 2011] (15 pages).
International Search Report and Written Opinion dated Feb. 25, 2014 in International Application No. PCT/US2013/043011.
International Search Report and Written Opinion for PCT/US2014/048408 issued Mar. 12, 2014.
International Search Report and Written Opinion for PCT/US2012/028069 issued Jun. 1, 2012,1-7.
International Search Report and Written Opinion issued in PCTIUS2012/028279 on Jun. 6, 2012.
Jason Hill & Carl Gutwin, The MAUI Toolkit: Groupware Widgets for Group Awareness, p. 539-571 in Computer Supported.
John Day-Richter, Internet Archive Copy of Online Article; What's Different About the New Google Docs: Making Collaboration Fast, Sep. 9, 2010, 1-6, http:f/web.archive.org/web/20100927180700/http:J/googledocs.blospot. com/2010/09/whats-different-about-new-google-docs_23.html, retrieved Feb. 14, 2012.
Junuzovic et al., Read, Write and Navigation Awareness in Realistic Multi-View Collaborations, International Conference on Collaborative Computing: Networking, Applications and Worksharing, 2007, 494-503.
Kindberg, "Mushroom: A Framework for Collaboration and Interaction across the Internet," Google 1996, pp. 1-11.
Krieger, "Documents, Presentations, and Workbooks: Using Microsoft® Office to Create Content That Gets Noticed," published May 2011, pp. 1-104.
Masoodian, M., et al., "RECOLED: A Group-Aware Collaborative Text Editor for Capturing Document History," In Proceedings of IADIS International Conference on WWW/Internet, Lisbon, Portugal, Oct. 19-22, 2005, International Association for Development of the Information Society, vol. 1, 323-330.
Muhammad et al., "Awareness Elements in Web Based Cooperative Writing Applications," Second Asia-Pacific Conference on Computationa Intelligence and Industrial Applications, 18 pages (2009).
Mulvany, "What's Going on in Indexing," ACM 1997, pp. 10-15.
Munteaunu et al., "Collaborative Editing for Improved Usefulness and Usability of Transcript-Enhanced Webcasts," ACM 2008, pp. 373-382.
Nasir et al., "Collaborative Report Creation System for Industrial Use," Yamagata University, Graduate School of Science and Engineering; Yamagata, Japan 2009 (6 pages).
Nauman et al., "Apex: Extending Android Permission Model and Enforcement with User-Defined Runtime Constraints," ASIACCS '10 Apr. 13-16, 2010 Beijing, China.
Nichols et al., High-Latency, Low-Bandwidth Windowing in the Jupiter Collaboration System, UIST '95. 8th Annual Symposium on User Interface Software and Technology. Proceedings of the ACM Symposium on User Interface SoftwareandTedmology,Nov. 14-17, 1995,111-120.
Pacull et al., "Duplex: A Distributed Collaborative Editing Environment in Large Scale," ACM 1994, pp. 165-173.
Peels et al., Document Architecture and Text Formatting, ACM Transactions on Office Information Systems, XX, XX, 310/1/1985,347-369.
Raggett, Dave, "Slidy—a web based alternative to Microsoft PowerPoint," published 2006, pp. 1-13.
Raman, "Cloud Computing and Equal Access for All," Google Inc. 2008 (4 pages).
Shen et al., "Flexible Merging for Asynchronouse Collaborative Systems," Griffith University, School of Computing an Information Technology, Brisbane, Australia 2002 (18 pages).
Shen et al., "Integrating Advanced Collaborative Capabilitites into Web-Based Word Processors," Nauyang Technological University, School of Computer Engineering, Singapore 2007 (8 pages).
Taylor, "Cool Apple Keynote Presentation Tricks and Tips," published Apr. 2011, p. 1-5.
The Oauth 2.0 Authorization Protocol; draft letf-oauth-v2-24; Mar. 8, 2012.
Using Adobe Flash Professional CS5 & CS5.5, Jan. 16, 2012, Adobe Systems Incorporated, pp. 125-126, http://help.adobe.com/en_US/flash/cs/using/flash_cs5_help.pdf.
Wang et al. Google Wave Operational Transformation, Jul. 1, 2010, 1-6, retrieved from the Internet Feb. 14, 2012: http:/1 wave-protocol.googlecode.comfhg/Whitepapers/operational-transform/operational-transform.html.
Wempen, Faithe, "PowerPoint 2010 Bible," May 24, 2010, John Wiley & Sons, pp. 491-519.
Zafer "NetEdit: A Collaborative Editor," Blacksburt, Virginia 89 pages (Apr. 23, 2011).
Zhou et al., "Taming Information-Stealing Smartphone Applications (on Android)," LNCS 6740:93-107 (2011).

* cited by examiner

| SUGGESTED EDIT ID | WHO SUGGESTED? | DEPENDENT ON ANOTHER EDIT | EDIT TYPE | EDIT POSITION |
|---|---|---|---|---|
| 1254 | REVIEWER A | N/A | ADDITION | 9817 |
| 574 | REVIEWER B | N/A | DELETION | 9674 |
| 1345 | EDITOR C | 1254 | ADDITION | 9817.1 |
| 355 | REVIEWER A | N/A | TABLE DIMENSION | 9781 |

SYSTEMS AND METHODS FOR PROVIDING JUST-IN-TIME PREVIEW OF SUGGESTION RESOLUTIONS

FIELD OF THE INVENTION

In general, this disclosure relates to electronic documents, in particular, to systems and methods for providing previews of suggestion resolution.

BACKGROUND

During development of an electronic document, it is often desirable to have multiple users propose changes and comment on a draft of the electronic document. For example, an author may create an initial draft of an electronic document and send a copy of the electronic document to one or more reviewers to make comments or changes in the document. Each reviewer may independently propose changes or make comments in the electronic document and return a revised version of the electronic document back to the author. Since each reviewer may create a unique version of the electronic document, there may be conflicts across different versions. The original author will need to resolve the conflicting edits and re-send updated copies of the electronic document to the reviewers. These steps will need to be repeated until the author and all of the reviewers are satisfied with a version of the electronic document. One way to increase the efficiency of this process is to allow multiple users to simultaneously make changes in a document.

SUMMARY

Systems and methods are disclosed herein for efficient editing of a document. One aspect relates to a system or method for providing a preview of an editor action related to an edit of an electronic document. An edit is provided by a first user of the electronic document, and a user interface displays the edit to the electronic document. A user input from a second user of the electronic document is detected, where the user input is indicative of a desire to preview a result of the editor action on the edit. A processor provides a preview of the result of the editor action in response to detecting the user input, where the preview is provided before the second user performs the editor action.

Another aspect relates to a system including means for providing a preview of an editor action related to an edit of an electronic document that is provided by a first user of the electronic document. The system includes means for displaying an edit to the electronic document, and means for detecting a user input from a second user of the electronic document. The user input is indicative of a desire to preview a result of the editor action on the edit. The system also includes means for providing a preview of the result of the editor action in response to the detection of the user input, where the preview is provided before the second user performs the editor action.

In some implementations, the edit is a suggested edit to the electronic document, and the editor action is an acceptance or a rejection of the suggested edit. The means for providing the preview may include means for temporarily applying the editor action to a visual rendering of the electronic document, and/or means for temporarily displaying an indication of a preview mode in a visual rendering of the electronic document. In some implementations, the system includes means for hiding the edit from a view of a published view of the electronic document until performance of the editor action is detected, where the editor action is an acceptance of the edit.

In some implementations, the first user has reviewer privileges associated with the electronic document and the second user has editor privileges associated with the electronic document. The first user and the second user may simultaneously access different views of the electronic document, where the different views are associated with the reviewer privileges or the editor privileges.

In some implementations, the system further includes means for detecting another user input from the second user, where the other user input is indicative of a desire to perform the editor action on the edit, and means for updating the electronic document to reflect the editor action.

In some implementations, the means for detecting the user input includes means for detecting a mouse cursor hovering over an action region of a display of the electronic document, where the action region is associated with the editor action. In some implementations, the means for detecting the user input comprises detecting a selection of a preview region of a display of the electronic document, where the preview region is associated with a preview of the editor action.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 3 is an example data structure stored on an electronic database that includes metadata corresponding to suggested edits, according to an illustrative embodiment.

DETAILED DESCRIPTION

To provide an overall understanding of the disclosure, certain illustrative embodiments will now be described, including a system for providing a preview of suggestion resolution. In particular, providing such previews allows for efficient development of a document. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
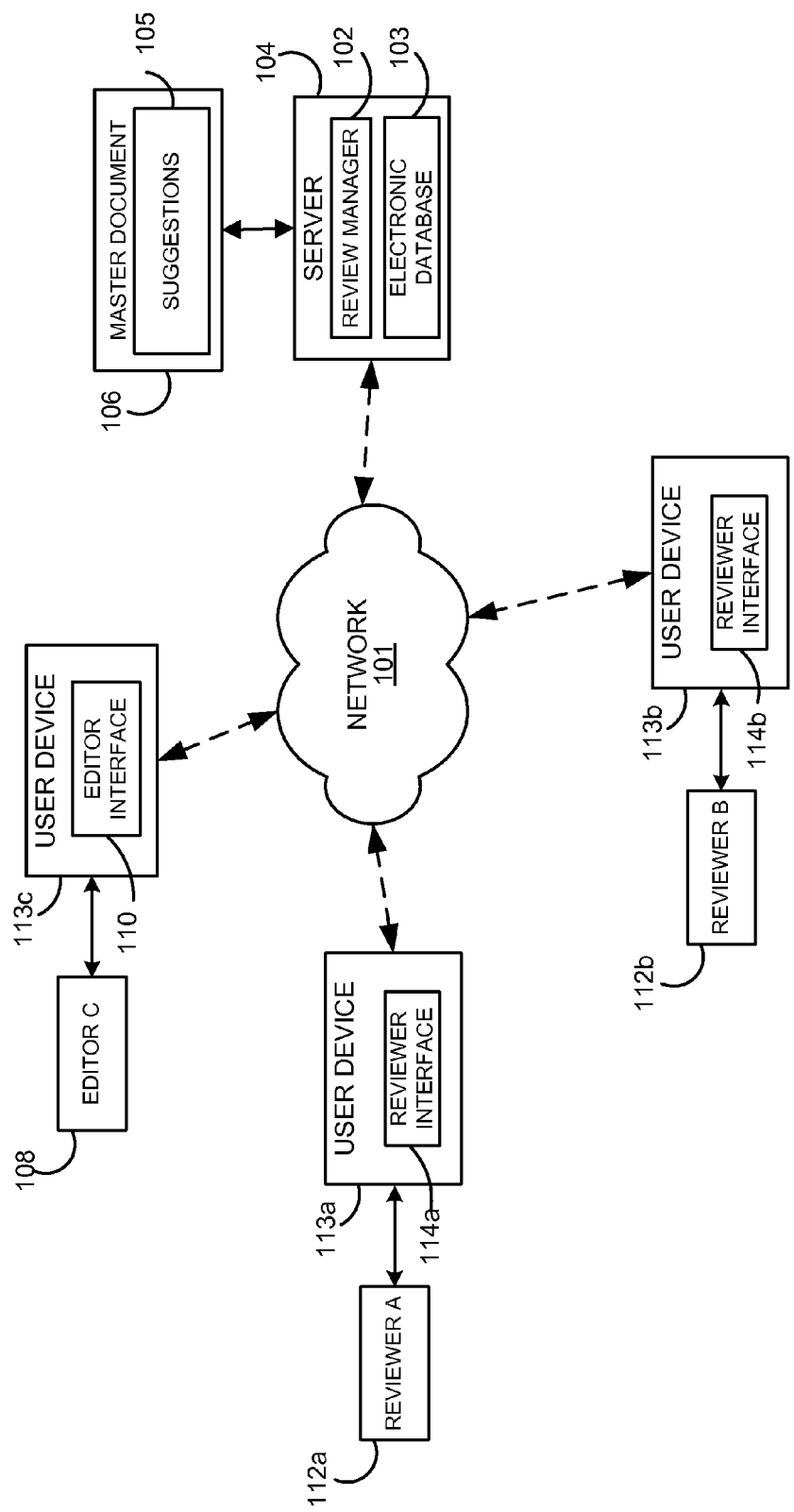
FIG. 1 is a block diagram of a computerized system for providing a preview of suggestion resolution in an electronic document, according to an illustrative embodiment.
Figure 2:
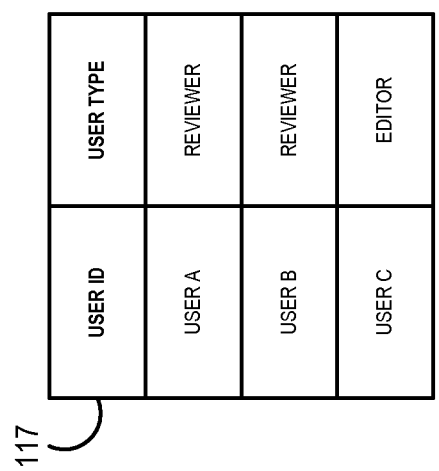
FIG. 2 is an example data structure stored on an electronic database that includes a document access control list, according to an illustrative embodiment.

FIGS. 1-3 are diagrams of a network and database structures that may be used to implement the systems and methods disclosed herein. FIG. 1 is a block diagram of a computerized system 100 for providing a preview of suggestion resolution, according to an illustrative embodiment. System 100 includes a server 104 and three user devices 113a-113c (generally, user device 113) connected over a network 101. The server 104 includes a review manager 102, which manages updates to various views of a master document 106.

The review manager 102 is configured to transmit and receive data over the network 101 in communication with the user devices 113. In particular, the review manager 102 receives data indicative of changes that a user at a user device 113 wishes to suggest or create related to the master document 106. Depending on the user type, which sets the access permissions for the user to access the master document 106, the review manager 102 then creates these changes by appending to a list of suggestions 105 corresponding to the master document 106. The list of suggestions 105 may be stored in the form of a data structure, an example of which is described in more detail in relation to FIG. 3.

The review manager 102 may include one or more processors and one or more memory units. In an example, the review manager 102 may be implemented over multiple subsystems that are configured to identify, process, and manage suggested edits to the document 106. The memory unit stores computer executable instructions, which are executed by the processor. The computer executable instructions include instructions for receiving data over the network 101, determining a user type for a given user, making changes in the master document 106, and publishing various views of the document 106 to various users. As depicted in FIG. 1, the master document 106 is stored on a separate device from the server 104, but the master document 106 may also be stored in the electronic database 103 or even in a memory unit included within the review manager 102. In addition, any data described herein as being stored on the electronic database 103 may instead or additionally be stored in a memory unit in the review manager 102 or on a separate memory unit external to the server 104.

FIG. 1 depicts three users, each associated with a user type defining a level of authority for access to and editing capabilities of certain views of the master document. Specifically, FIG. 1 depicts two reviewers 112a and 112b (generally, reviewer 112) and one editor 108. The users at user devices 113 may simultaneously interact with the master document 106 over user interfaces, such as a reviewer interface or an editor interface. In particular, each reviewer 112 interacts with the master document 106 over a reviewer interface 114a and 114b (generally, reviewer interface 114), and the editor 108 interacts with the master document over an editor interface 110.

Each user device 113 may include a personal computer, a laptop computer, a tablet, a smart phone, a personal digital assistant, or any other suitable type of computer or communication device. Users at the user devices access and receive information from the server 104 over the network 101. The user devices 113 may include typical components, for example, a display unit, an input device, an output device, a communication interface (e.g., editor interfaces 110 or reviewer interfaces 114), or any suitable combination thereof. A user may authenticate with the server 104 by inputting a user name and password (or providing other identification information) via a user interface, such that the same user device may be used by different users at different times, including users with the same or different user type.

Users interact with the server 104 such that the users, in conjunction with the server 104, generate an online document by collaboratively proposing changes in the document 106. Although illustrated as a single device in FIG. 1, the server 104 may be implemented as, for example, a single computing device or as multiple distributed computing devices. The interaction of users with the server 104 is through user interfaces 114 and 110, which may include web browsers. For example, the document may be viewed with an application that displays the document within a web browser. In this arrangement, users do not need to install software locally to their user devices to view and make changes in the document. When browsers or user interfaces are discussed herein, these terms are intended to refer to any program that allows a user to browse documents, regardless of whether the browser program is a standalone program or an embedded program, such as a browser program included as part of an operating system. The logic described herein can be implemented in hardware, software, firmware, or a combination thereof.

In an example, the document 106 is a text document. One of skill in the art will understand that the features and concepts described herein may be applied in any type of collaborative document application, including, for example, spreadsheet applications, presentation applications, drawing applications, and others.

One type of document user is reviewer 112, who has certain authority and access to the document. Typically a reviewer may view and make suggested edits and comments on the document 106. To do this, the reviewer 112 views the document on the reviewer interface 114 and makes a change to the document. Data indicative of the change is sent over the network 101 to the server 104, where the review manager 102 receives the data and adds the data to the list of suggestions 105 associated with the document 106. The change may be a suggested edit to the document 106, such as an insertion, deletion, replacement, move, format change, or any other suitable change in a document. In another example, the change may be a comment on the document 106 or a portion thereof. Changes of different types (such as insertions, deletions, replacements, moves, format changes, or comments, for example) may be saved differently in the list of suggestions 105. For example, different lists may be used to store changes of different types. As another example, changes of different types may be stored together as entries in one list, with each entry having a label indicative of the change type.

Another user type is an editor 108, who has a greater level of authority (i.e., a larger set of permissions) for the document 106 than the reviewer 112. The editor 108 can accept or reject any suggested edits made by the reviewer 112, and further can delete any comments made by the reviewer 112. Access and authority may vary and be customized for a document allowing different access and use capabilities for different users. For example, the editor 108 may be an owner or a creator of the document 106, and the editor 108 may assign one or more users to a reviewer type role. When a reviewer (such as reviewer 112a) makes a suggested edit to the document 106, the editor 108 is prompted to perform an editor action on the suggested edit.

Figure 13:
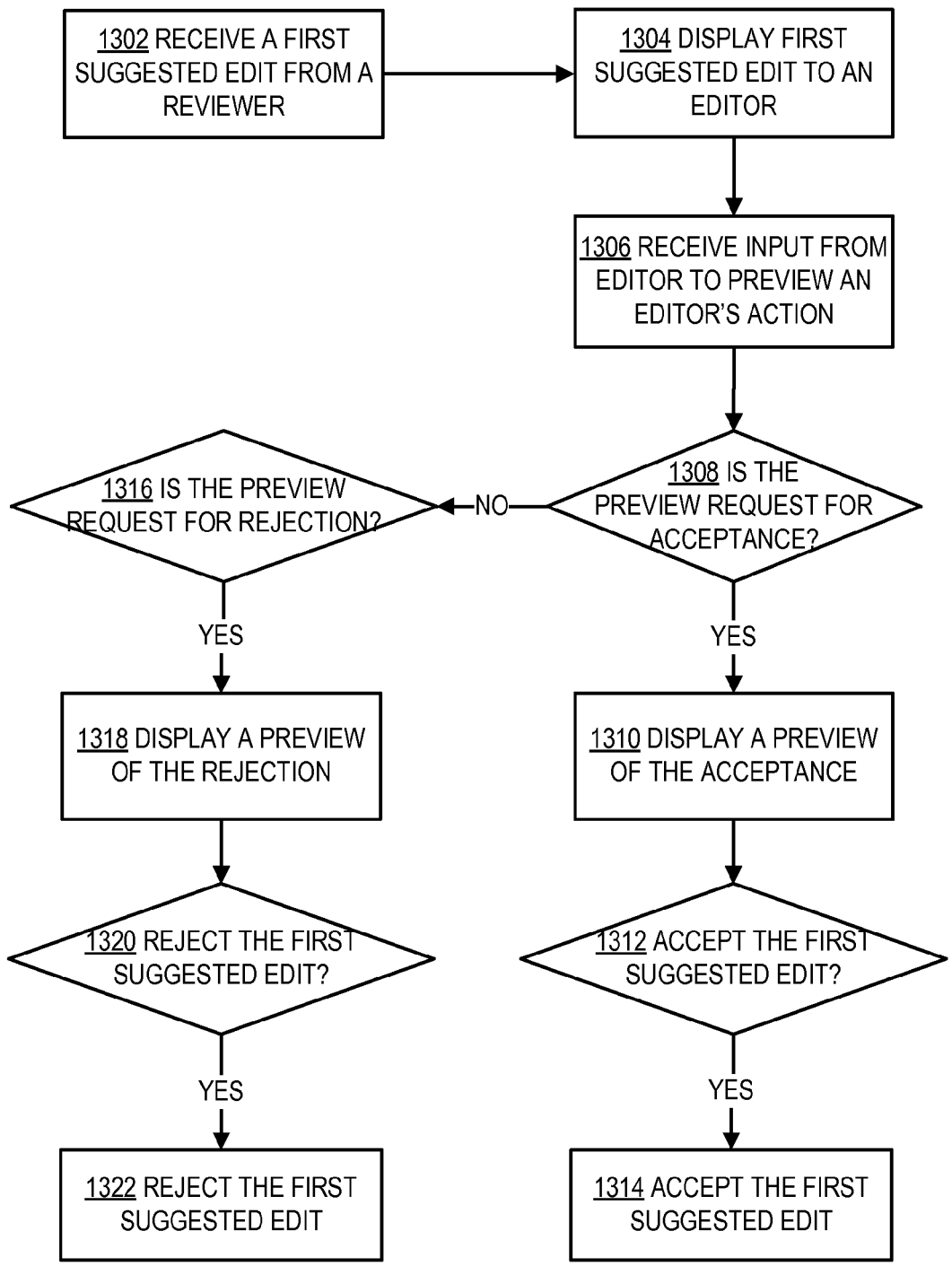
FIG. 13 is a flowchart of a method used by an editor interface or a review manager to manage previews and updates in a document, according to an illustrative embodiment.
Figure 14:
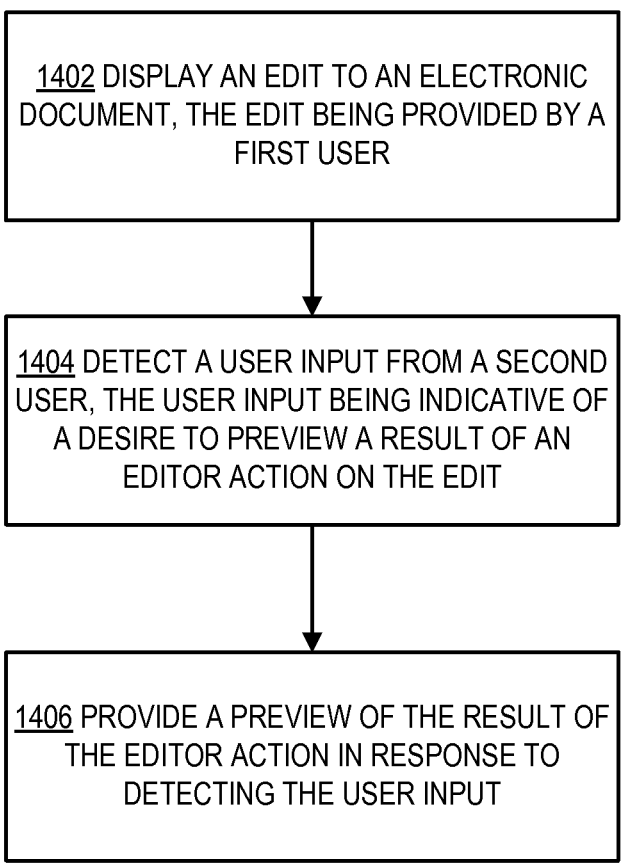
FIG. 14 is a flowchart of a method used by an editor interface to manage generating previews of changes to a document, according to an illustrative embodiment.

Before the editor action is performed by the editor 108, the editor 108 may provide a user input to the editor interface 110 indicative of a desire to preview a result of an editor action on the suggested edit. The editor action may be an acceptance or a rejection of the suggested edit, and the preview includes a temporary visual rendering of the document 106 that incorporates the acceptance or rejection. The editor interface 110 provides such a preview to the editor 108 so that the editor 108 may observe the change or changes to the document 106 if the editor action is performed, and allows for the editor 108 to make an informed decision regarding whether to perform the editor action. When the anticipated editor action is a rejection of a suggested edit, the preview includes a markup view of the document 106 (i.e., including the original document 106 and all accepted suggested edits) without the suggested edit. When the anticipated editor action is an acceptance of a suggested edit, the preview includes the markup view of the document including what the suggested edit would look like if the suggested edit were accepted. In some implementations, the preview includes a clean view of the document and a preview of a rejection or an acceptance of the suggested edit. Providing such a preview to the editor 108 enables the editor 108 to view what the document would include, if the editor 108 were to perform the anticipated editor action. As described herein, the editor interface 110 generates the visual rendering of the preview of the document. In some implementations, the server 104 or the review manager 102 may perform generation of the visual rendering. Example displays of the preview are shown in FIGS. 4-12, and example methods of generating a visual rendering of the preview are shown in FIGS. 13 and 14.

When a suggested edit is accepted by the editor 108, the review manager 102 converts the suggested edit into an accepted edit and updates the master document 106 with the accepted edit. In addition, the accepted edit may be removed from the list of suggestions 105, or an indicator label may be set for the accepted edit to indicate that the edit has been accepted. If the editor 108 rejects a suggested edit, the review manager 102 removes the suggested edit from the list of suggestions 105, or an indicator label may be set for the edit to indicate that the edit has been rejected or dismissed.

In addition to accepting or rejecting changes made by the reviewer 112, the editor 108 also has access to make direct changes to the document by directly editing or making comments on the document 106. The review manager 102 generally treats edits made by the editor 108 as accepted edits which are automatically applied to the document 106. Alternatively, the editor 108 may wish to make a suggested edit in order to get input from the reviewer 112 or other editors regarding the suggested edit. In this case, the editor 108 may mark an edit as "suggested" or may set the user device 109 to operate in "reviewer mode," such that the suggested edit appears in the list of suggestions 105 of the document to the reviewer 112. Then, the reviewer 112 may modify the suggested edit or comment on the suggested edit, and the editor 108 may then decide whether to accept or reject the suggested edit(s).

In addition, the editor 108 may make direct changes to the suggested edits that are made by the reviewer 112. For example, the editor 108, rather than accepting or rejecting a suggested edit made by reviewer 112a, instead may modify the suggested edit. The review manager 102 detects that an editor 108 (a user with greater privileges) has modified a suggested edit originally created by a reviewer 112 (a user with fewer privileges), thereby determining that the modification made by the editor 108 is privileged relative to the suggested change made by the reviewer 112. Because of the privileged modification to the reviewer's suggested change, the editor 108's modification is incorporated into the reviewer 112a's suggested change. By integrating or combining the modification with the suggested change, when the suggested change is accepted (or rejected), the modification by the editor 108 is also accepted (or rejected).

Thus, in addition to managing the list of suggestions 105 for the master document 106, the review manager 102 also keeps track of relationships between suggested edits in the list of suggestions 105. In particular, the review manager 102 may include a compound identifier, a conflict identifier, or both. The compound identifier and the conflict identifier may each identify a shared position between two or more suggested edits in the document 106 and may determine that the suggested edits that share a position in the document 106 have a particular relationship.

Two suggested edits have a compounding relationship if one of the suggested edits is dependent on the other suggested edit. For example, the reviewer 112a may make a first suggested edit such as an insertion of some text into the document 106. Then, the reviewer 112b may make a second suggested edit such as a change within the suggested insertion made by reviewer 112a. The reviewer 112b may suggest making another insertion, making a deletion, fixing a spelling mistake, or any other change of the suggested insertion made by reviewer 112a. In this case, the second suggested edit has a compounding relationship with the first suggested edit, and when the second suggested edit is made, the review manager 102 detects the compounding relationship and may store an indication of the compounding relationship in the list of suggestions 105.

Two suggested edits have a conflicting relationship if one of the suggested edits conflicts with the other suggested edit. For example, a first suggested edit may be a deletion of a segment of text, and a second suggested edit may be an insertion of some text within the deleted segment. In this case, the first and second suggested edits have a conflicting relationship, meaning that the editor 108 may not accept both suggested edits. Thus, if the editor 108 accepts the first suggested edit, the review manager 102 may automatically update the second suggested edit as rejected. In this case, the editor 108 implicitly rejects the second suggested edit by accepting the first suggested edit. Similarly, if the editor 108 accepts the second suggested edit, the review manager 102 may automatically update the first suggested edit as rejected. In this case, the editor 108 implicitly rejects the first suggested edit by explicitly accepting the second suggested edit. An example of a data structure for storing the list of suggestions 105 is described in more detail in relation to FIG. 3.

The updates to the master document 106 and the list of suggestions 105 are performed nearly in real-time. This means that when the reviewer 112 and the editor 108 are simultaneously viewing and accessing the document, the reviewer 112 receives feedback regarding a suggested edit almost immediately after the editor 108 sends the feedback. The system 100 is especially advantageous for the case when a suggested edit made by the reviewer 112 may affect additional suggested edits made by the reviewer 112. For example, it is helpful for the reviewer 112 to receive early feedback from an editor 108 regarding a suggested edit because the feedback may influence future suggested edits. The real-time updates to the document 106 also allow for reviewers 112 to make suggestions at their own pace. Even when just a single reviewer 112 has the document 106 open, indications of the suggestions or comments that are made by the active reviewer 112 may be sent to other users, such as other reviewers 112 or one or more editors 108. The notifications may be sent over email messages or any other form of communications that may alert an editor and/or reviewer to the suggested changes. An editor 108 may then access the document 106 at a later time and accept, reject, or modify a suggestion made by the reviewer 112. In some implementations, the notifications are sent only to the one or more editors 108, and not to any of the other reviewers 108.

When relationships between two or more suggested edits are detected, the relationships may be used to provide the preview of the result of an editor action. For example, if an editor 108 selects to preview a result of an acceptance of a first suggested edit, the preview includes a temporary visual rendering of the document 106 that incorporates the acceptance of the first suggested edit, as well as an acceptance of any suggested edits on which the first suggested edit depends (i.e., have a compounding relationship with the first suggested edit). The temporary visual rendering of the document 106 may further incorporate the rejection of any suggested edits that have a conflicting relationship with the first suggested edit. Similarly, if an editor 108 instead selects to preview a result of a rejection of the first suggested edit, the temporary visual rendering of the document 106 incorporates a rejection of any suggested edits that depend on the first suggested edit (i.e., have a compounding relationship with the first suggested edit), but may take no action on any suggested edits that conflict with the first suggested edit, because a rejection of the first suggested edit does not automatically result in an acceptance or a rejection of any conflicting suggested edits. By providing a preview to the editor 108, the editor 108 may observe the anticipated change or changes to the document 106 if the editor action is performed, and the systems and methods described herein allow for the editor 108 to make an informed decision regarding whether to perform the editor action.

In some implementations, a user such as a reviewer 112 and/or an editor 108 may select to view the master document 106 including any suggested edit satisfying one or more criteria. As an example, a user may wish to view only suggested edits of a certain type, such as insertions, deletions, replacements, format changes, spelling mistakes, or any other suitable type of suggested edit.

The reviewer 112 and the editor 108 may view who else is currently viewing the document. When more than one user views the document at a time, the users may communicate with each other over an instant messaging application.

One editor and two reviewers are shown in FIG. 1 to avoid complicating the drawing; however the system 100 can support any number of users with the same or different user type. When there are multiple reviewers, a reviewer (i.e., reviewer 112a) may view suggested edits and comments made by other reviewers (i.e., reviewers 112b and others) or editors. In this way, by allowing for efficient collaboration across a set of users proposing changes in a document, the system 100 offers significant advantages over a system in which reviewers independently propose changes in a document. Thus, when an editor 108 views the document, the editor 108 may view a live stream of collaborative updates made by multiple reviewers 112 at the same time, significantly reducing the amount of time to develop the document. In addition, a third type of user is a viewer (not shown), who may view the document 106 including any accepted edits, but not any pending suggested edits (that have not yet been accepted or rejected). In some implementations, a viewer may be allowed to view pending suggested edits.

In certain implementations, each user may be assigned a unique color, such that the changes of the document are color-coded by the user who made the changes. In addition, changes made by editors 108 may be marked differently on view of the document from changes made by reviewers. Further, a user may select to view the document 106 including all suggested edits of a certain type, such as all suggested edits made by a particular user or type of user, or all suggested edits corresponding to a specific edit type, such as all insertions, deletions, replacements, moves, format changes, spelling changes, or any other suitable edit type. An editor 108 may, at once, accept or reject all suggested edits made by a particular user or all suggested edits corresponding to a specific edit type, or some suitable combination thereof.

FIG. 2 is an example data structure 117 stored on electronic database 103 that includes a document access control list, according to an illustrative embodiment. The document access control list includes a list of users who have access to a view of the master document 106 and their corresponding user types. In this case, multiple users have the same user type. In particular, there are two reviewers (users A and B) and one editor (user C), all of whom may simultaneously interact with the master document 106.

FIG. 3 depicts an exemplary data structure 118 stored on the electronic database 103 that includes metadata corresponding to suggested edits, according to an illustrative embodiment. The data structure 118 includes four records of suggested edits. Each record in the data structure 118 includes a "suggested edit id" field whose values include identification numbers for the edits. Each record in the data structure 118 corresponds to a suggested edit and further includes the user id of the user who suggested the edit, an indicator of any other suggested edit on which the suggested edit depends, an edit type associated with the suggested edit (i.e., addition, deletion, move, replacement, format changes, spelling changes, or any other suitable edit type), and an edit position identifier that indicates a position of the edit in the electronic document 106. The data structure 118 indicates that the suggested edit 1345 has a shared edit position with the suggested edit 1254 because the edit position identifiers associated with both suggested edits are similar. As shown in FIG. 3, the edit position identifier is a four digit number, which may correspond to distinct locations within the electronic document 106. The edit position identifier for the suggested edit 1345 is the same as the edit position identifier for the suggested edit 1254, with an additional incremental value. The incremental value may indicate a location within the suggested edit 1254 where the suggested edit 1345 takes place. In general, the edit position identifier may be any suitable identifier, such as a pointer to a location in the document, an address that stores such a pointer, or any other suitable way of referring to a position in a document.

From the shared edit position, the review manager 102 may determine that the suggested edit 1345 depends on (or equivalently, has a compounding relationship with) the suggested edit 1254. The data structure 118 is shown for illustrative purposes only, and other fields with additional data may also be included. Examples of such additional data include the time of the suggested edit, whether the suggested edit was accepted or rejected, who accepted or rejected the suggested edit, and the time of the acceptance or rejection. Furthermore, when a suggested edit includes deleting, moving, or replacing existing objects in the document, the data structure 118 may further include which objects to delete, move, or replace. Similarly, when a suggested edit includes adding objects, the data structure 118 may further include which object(s) to add.

In some embodiments, the data related to a suggested edit may be stored as a mutation of the document. For example, a mutation may include data indicating changes made by the edit such as the user id of the user who created the suggested edit, deletions, additions, location of the edit, and a status of the edit, such as pending, rejected, or accepted.

Data structures 117 and 118 and the master document 106 may be stored on the same electronic database 103, or may be stored on different databases. In some embodiments, an original version of the master document 106 is stored on a database. For example, the combination of the original version and data structure 118 would be enough to generate various views of the document using a dynamic approach. In particular, if a user wishes to view only a subset of the suggested edits, a view of the document may be generated including the original version and the subset of suggested edits. The subset may include those suggested edits corresponding to a specific user, a user type, or an edit type. The generated view may not be stored on a database. Instead, when a user accesses the document, a view specific to that user (based on the user's settings) may be generated.

In addition to the data stored in example data structures 117 and 118, the review manager 102 may also store additional data. For example, data indicative of how all users interact with the document may be stored such as what portions of the document are most viewed or read.

Figure 4:
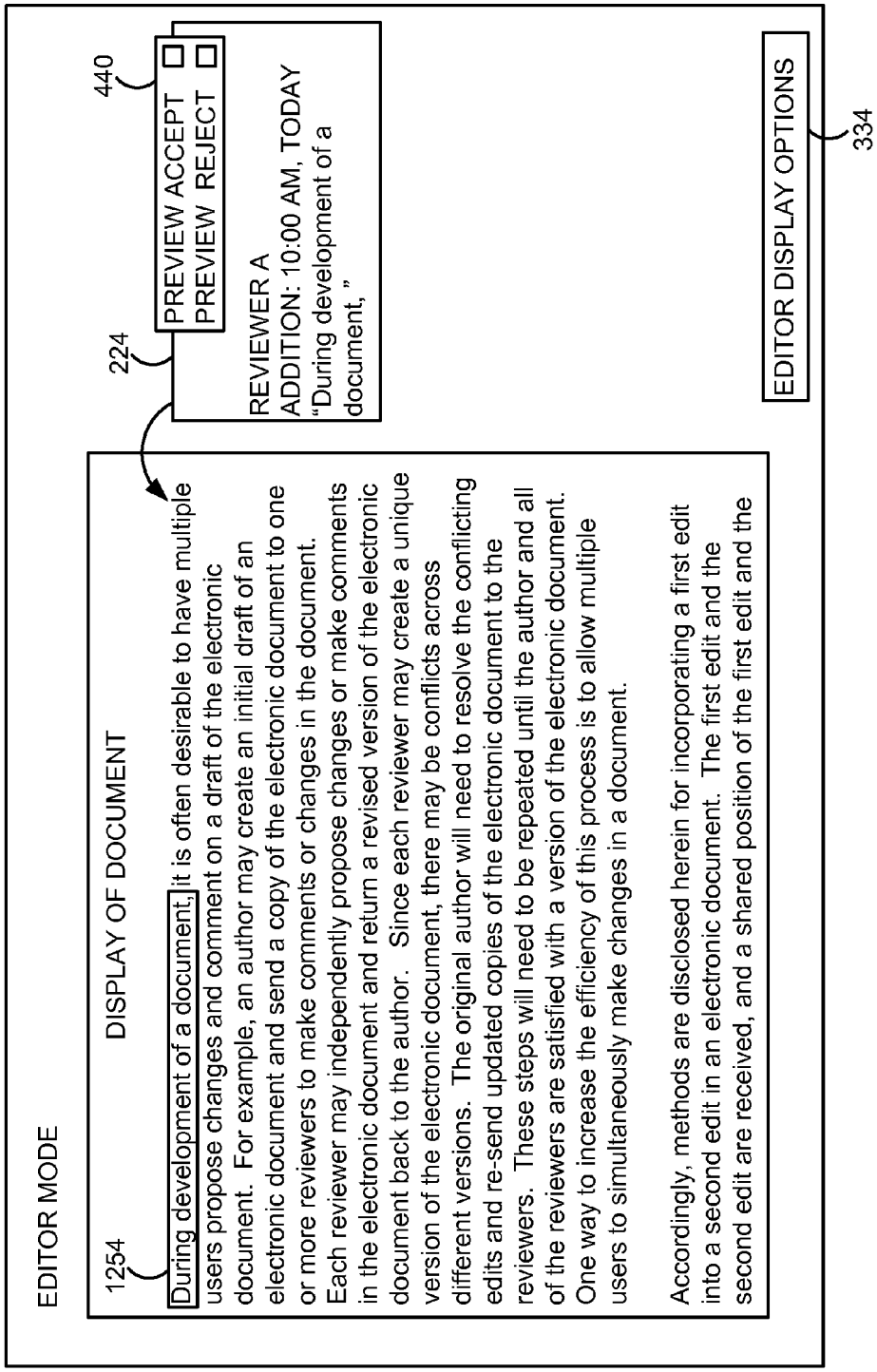
FIGS. 4-8 are diagrams of exemplary displays of an editor interface that provides previews of an editor's action on a suggested edit in an electronic document having text, according to an illustrative embodiment.
Figure 5:
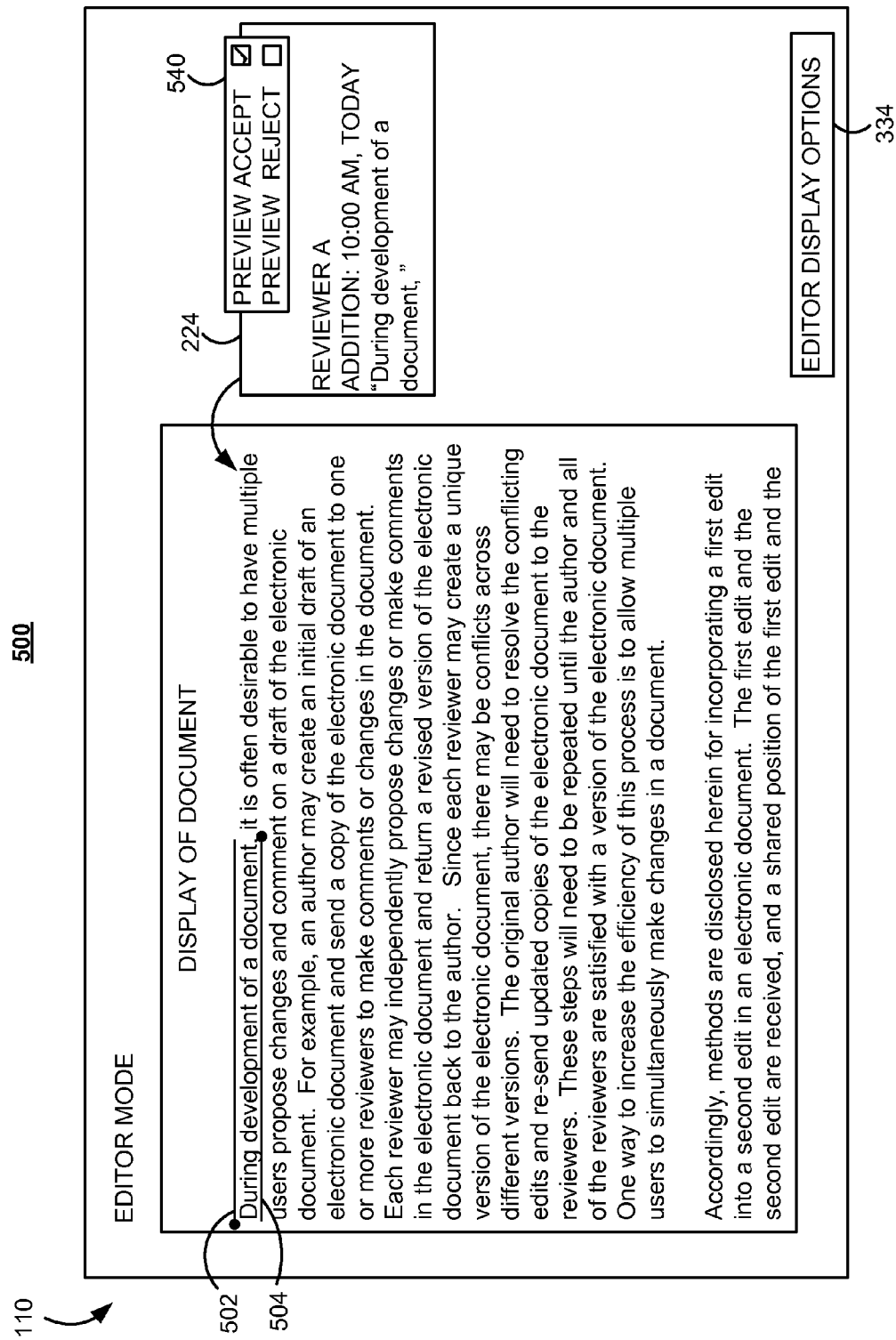
Figure 6:
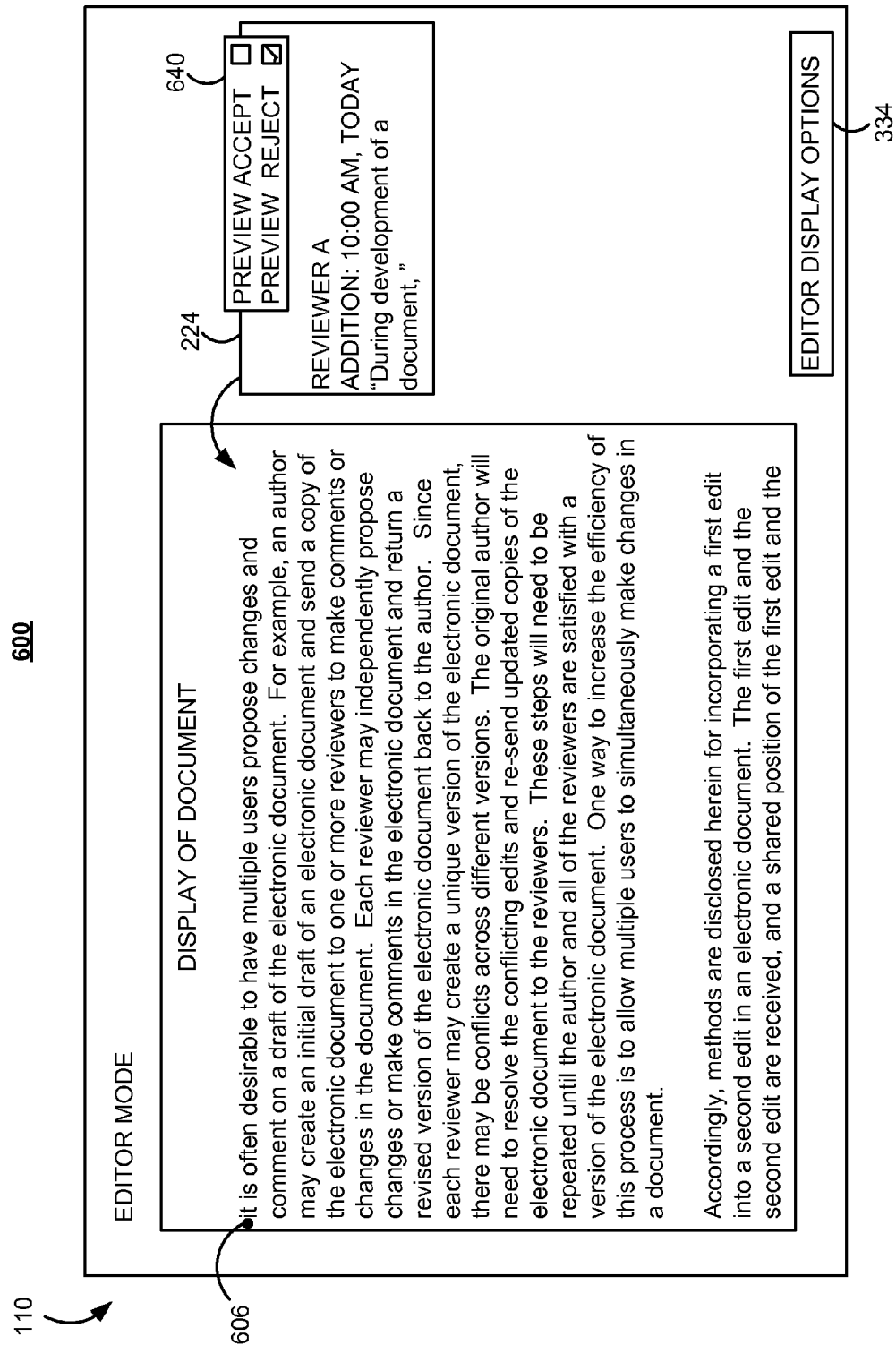
Figure 7:
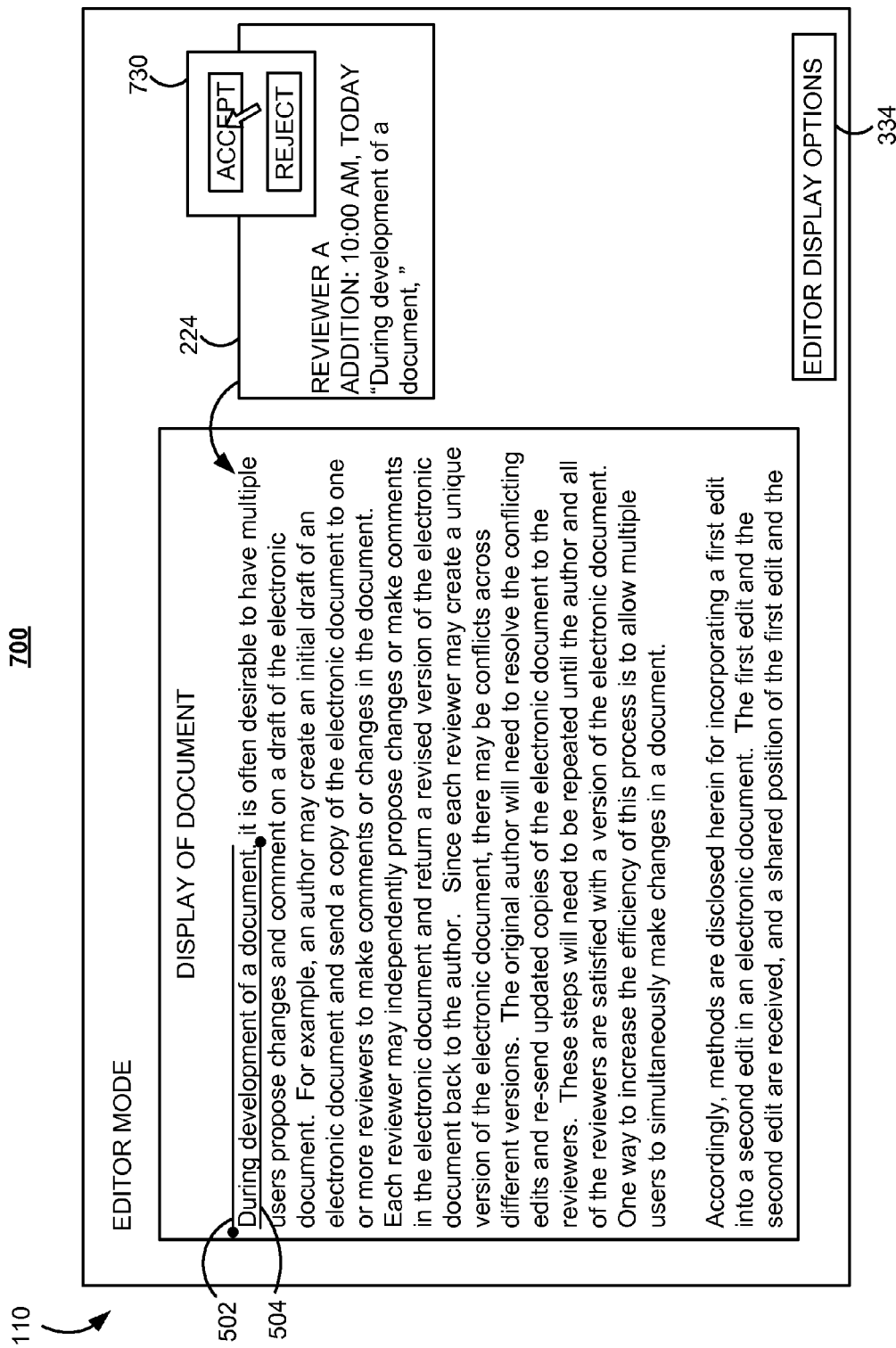
Figure 8:
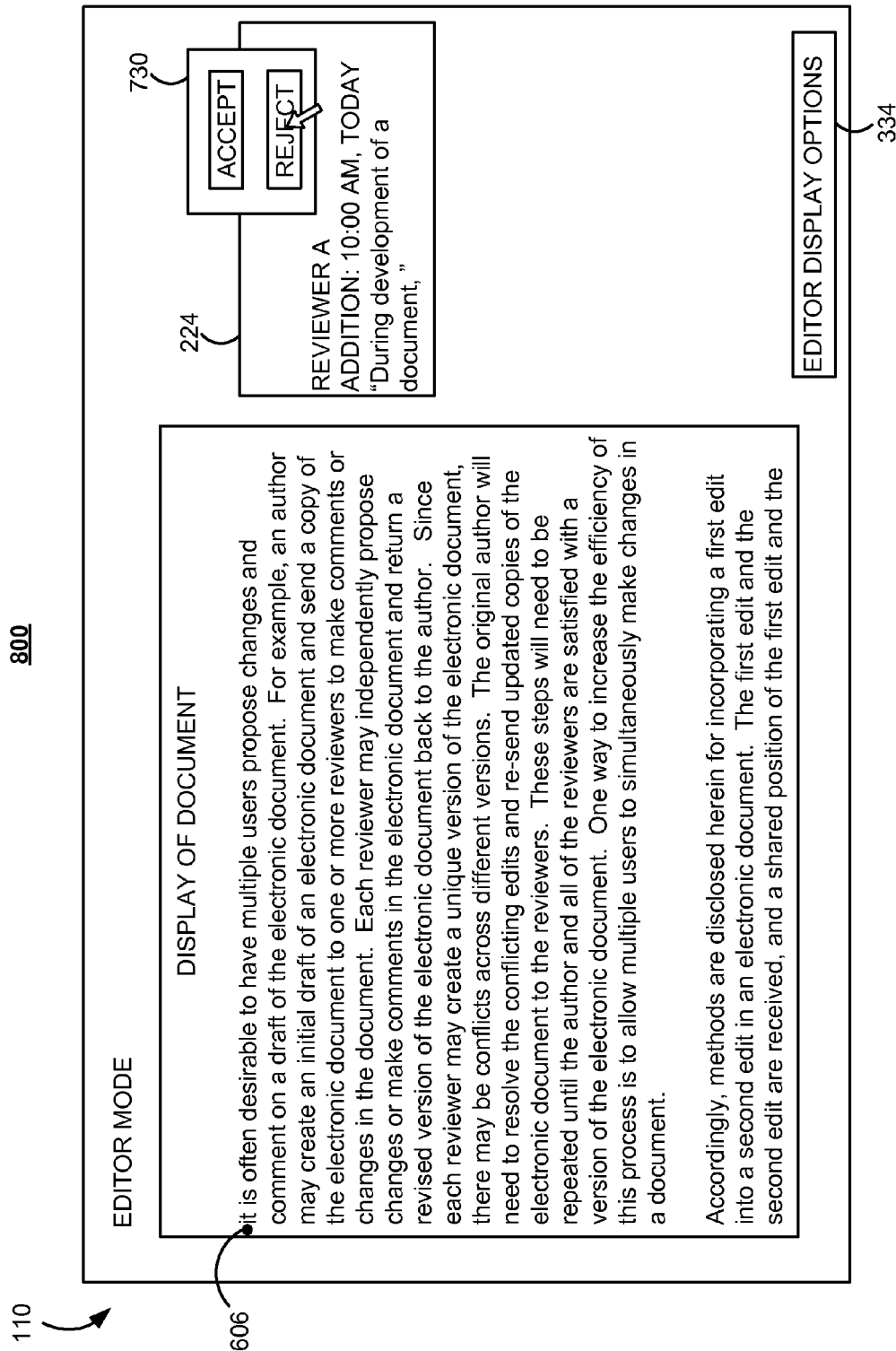
Figure 9:
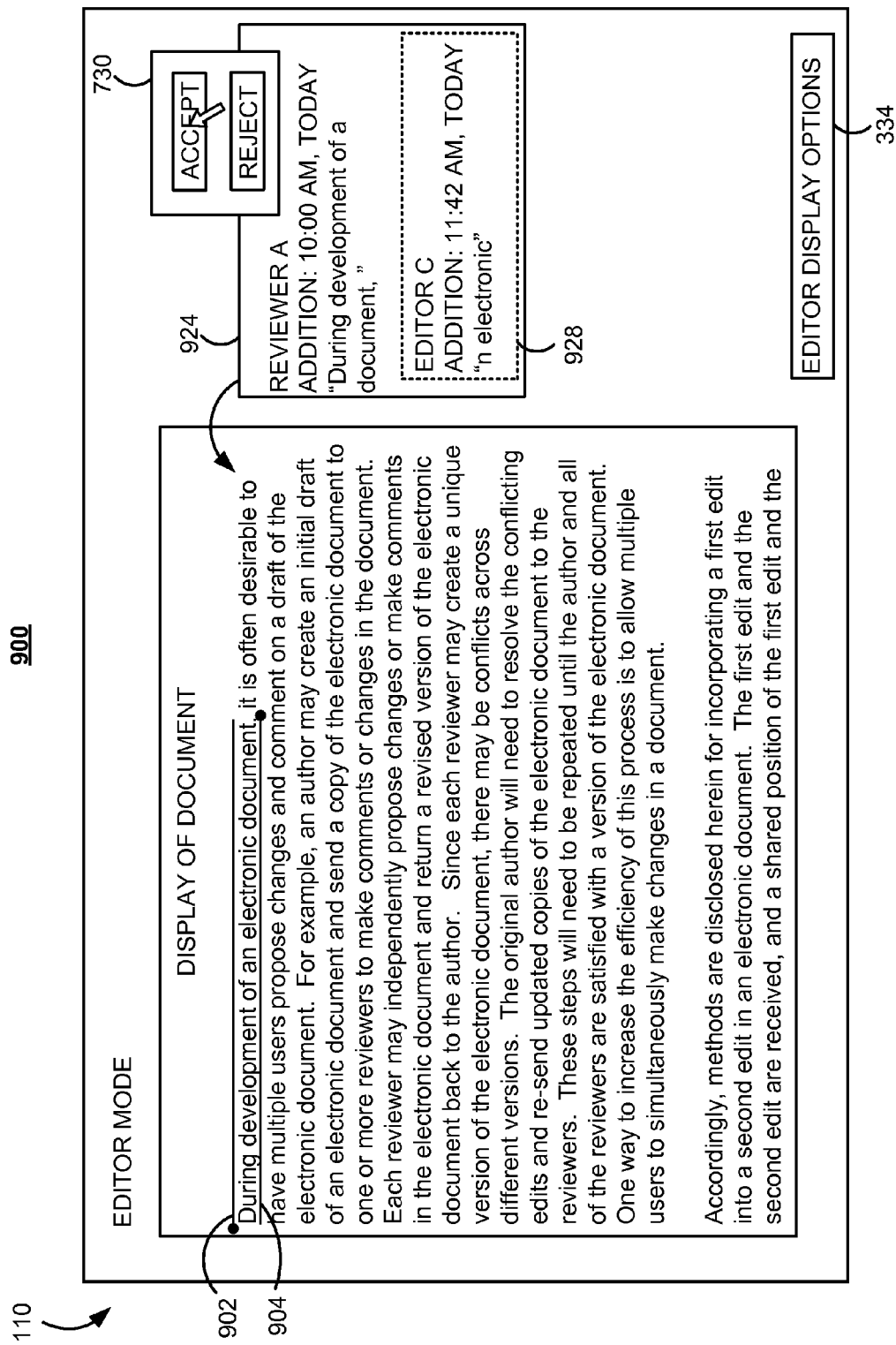
FIG. 9 is a diagram of an exemplary display of an editor interface that provides a preview of an editor's acceptance of a suggested edit that includes a privileged edit, according to an illustrative embodiment.
Figure 10:
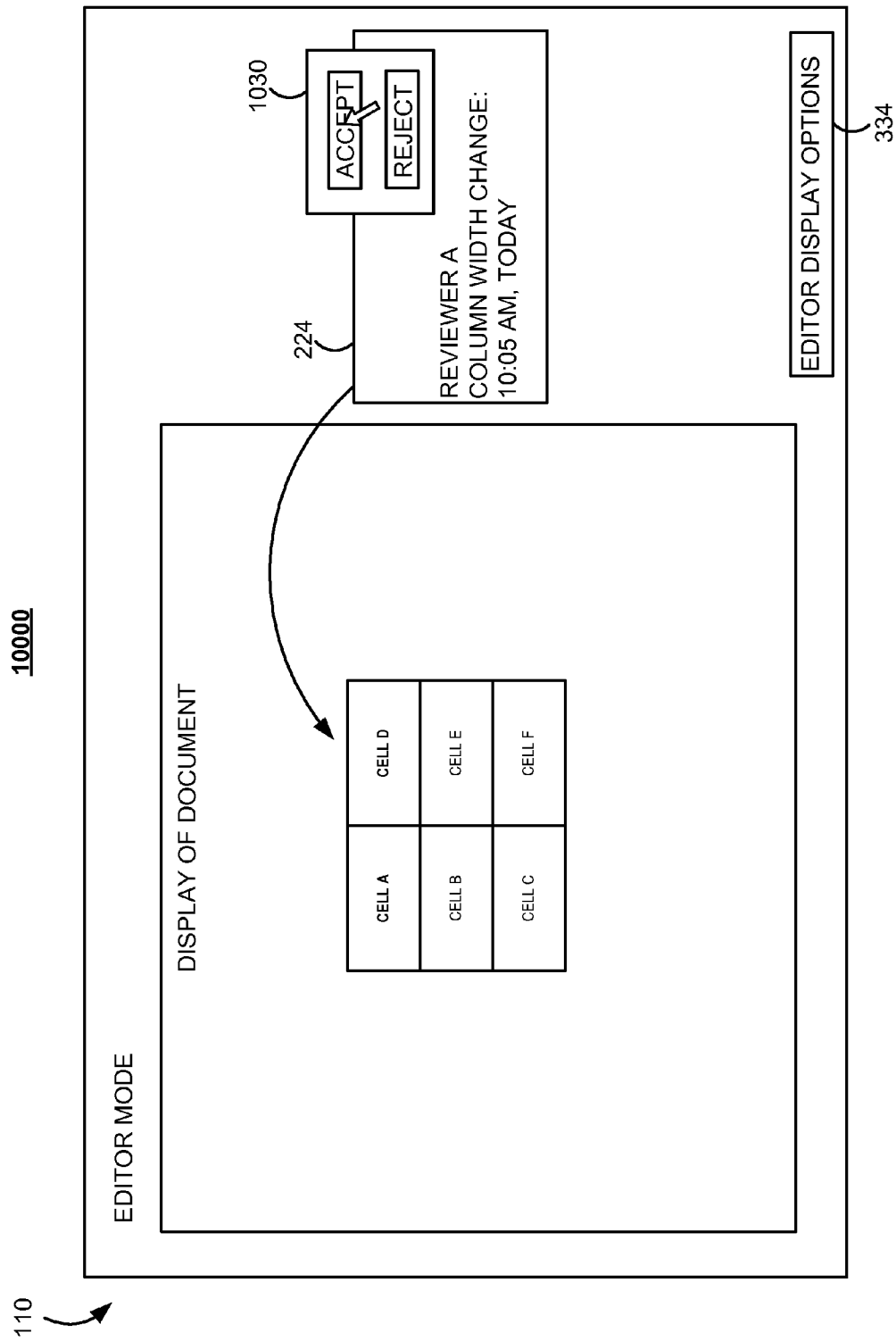
FIG. 10 is a diagram of an exemplary display of an editor interface that provides previews of an editor's acceptance of a suggested format change, according to an illustrative embodiment.
Figure 11:
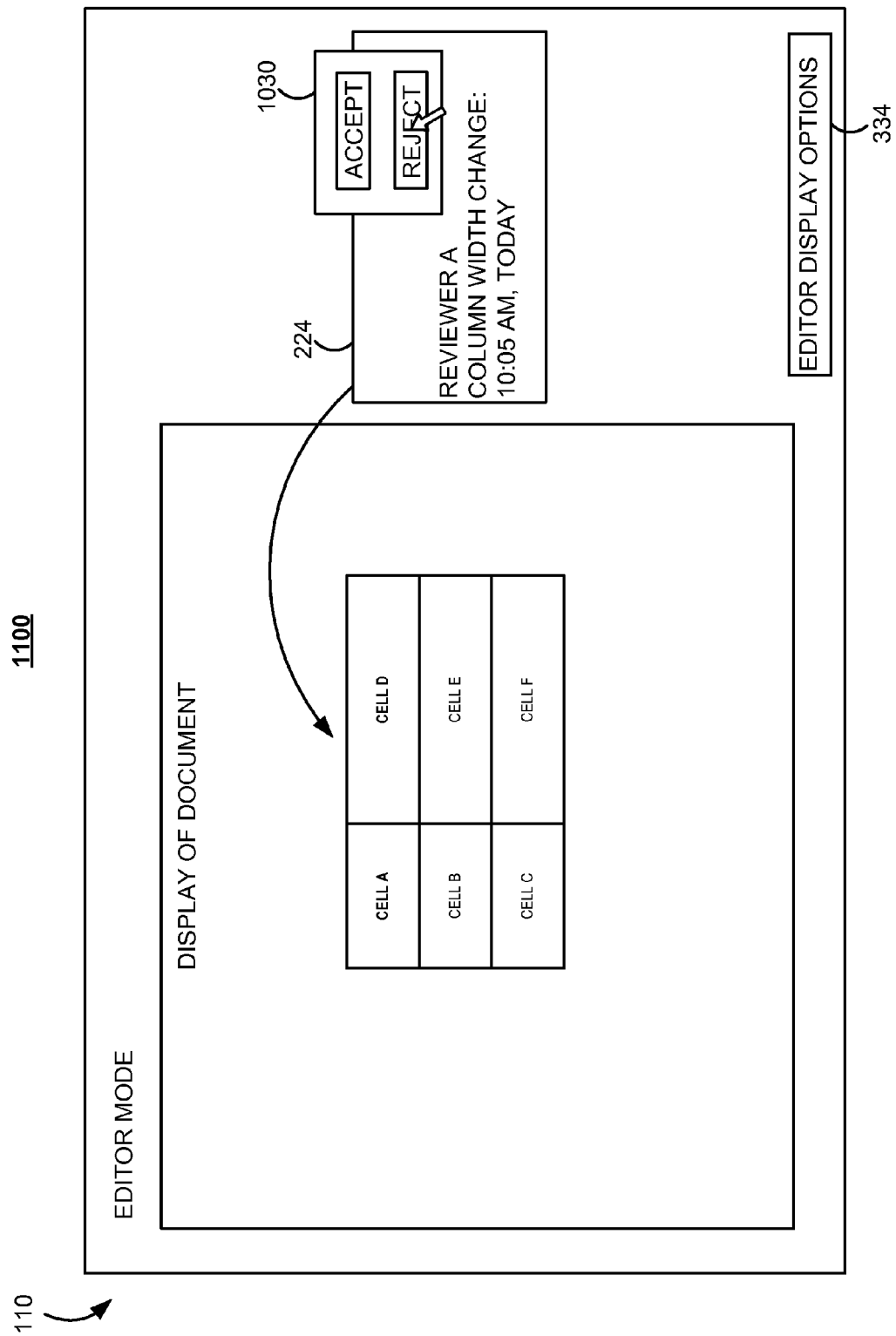
FIG. 11 is a diagram of an exemplary display of an editor interface that provides previews of an editor's rejection of a suggested format change, according to an illustrative embodiment.
Figure 12:
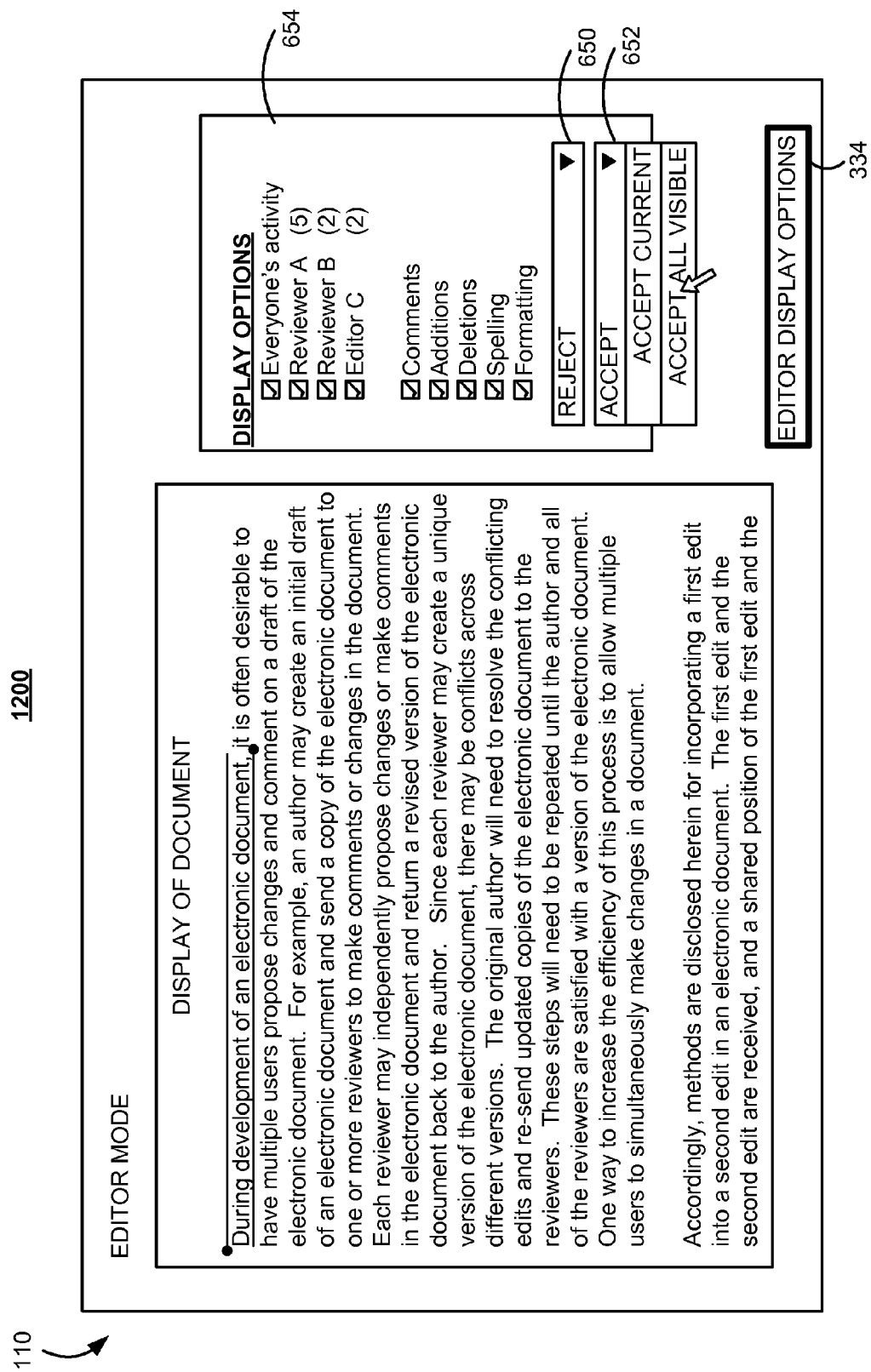
FIG. 12 is an exemplary display of an editor interface including a set of editor display options, according to an illustrative embodiment.

FIGS. 4-12 are diagrams of exemplary displays of a user interface for users interacting with the master document 106. In particular, FIGS. 4-8 are exemplary displays of an editor interface that provides previews of an editor's action on a suggested edit. FIGS. 5 and 7 are exemplary displays of the editor interface when the preview of an editor's acceptance of the suggested edit is shown, and FIGS. 6 and 8 are exemplary displays of the editor interface when the preview of an editor's rejection of the suggested edit is shown. FIG. 9 is an exemplary display of an editor interface that provides a preview of an editor's acceptance of a suggested edit that includes a privileged edit. FIGS. 10 and 11 are exemplary displays of an editor interface that provides previews of an editor's acceptance (FIG. 10) or rejection (FIG. 11) of a suggested format change. FIG. 12 is an exemplary display of an editor interface 110 including a set of editor display options.

FIG. 4 is an exemplary diagram 400 of a display of an editor interface 110 for an editor interacting with the master document 106, according to an illustrative embodiment. The display of the editor interface 110 may be updated in real time such that the editor is informed in real time of changes (i.e., in the form of suggested edits or comments made by reviewers or editors, or in the form of edits made by editors) of the document 106 made by other users. In this way, the editor may make his/her own informed changes of the document 106 in view of the latest suggestions made by all the other collaborators on the document 106. Therefore, the systems and methods described herein promote efficient collaboration for editing a document 106.

The diagram 400 includes a portion of an original document 106 with a suggested edit 1254. In particular, the suggested edit 1254 includes the addition of a portion of a sentence to the document and is distinguished from a remainder of the document by a box surrounding the text. In addition, the diagram 400 includes a sidebar on the right hand side of the editor interface 110 for displaying metadata associated with the suggested edit 1254. In particular, the sidebar includes a metadata region 224 associated with the suggested edit 1254. The metadata region 224 includes data indicative of which user made the suggested edit 1254 (i.e., Reviewer A), the edit type corresponding to the suggested edit 1254 (i.e., an addition), the time and date the suggested edit was made (i.e., 10:00 AM today), and an indication of the object to be added (i.e., "During development of a document,"). Metadata shown in the metadata region 224 may be stored in a data structure such as the data structure 118 shown in FIG. 3.

The diagram 400 also includes an action preview region 440 that corresponds to the suggested edit 1254. The action preview region 440 is a prompt for the editor 108 to make a selection to preview an acceptance or a rejection of the corresponding edit. When the editor 108 provides a user input (in the form of selecting one of the options in the action preview region 440), the display of the document is updated to reflect a preview of the editor's anticipated action (i.e., an acceptance or a rejection of the corresponding edit). Advantageously, by providing a preview of the result of the editor's anticipated action before the editor performs the action, the systems and methods described herein allow for the editor 108 to view the document 106 that includes the anticipated changes and make an informed decision regarding whether to accept or reject the suggested edit. Example displays of the preview when the anticipated editor action is an acceptance are shown in FIGS. 5 and 7, and example displays of the preview when the anticipated editor action is a rejection are shown in FIGS. 6 and 8. As shown in FIG. 4, the user input that the editor 108 provides is in the form of selecting one of the options in the action preview region 440. In general, the user input provided by the editor 108 to indicate a desire to view a preview of the editor action may be in any form, including a cursor hover over a button (as shown in FIGS. 7 and 8), or any other suitable user input. While other edits are not shown in FIGS. 4-8, one of ordinary skill in the art will understand that other edits to the document 106 may be shown in markup or in clean form during the preview of the document, without departing from the scope of the present disclosure.

FIG. 5 is an exemplary diagram 500 of a display of an editor interface 110 for an editor interacting with the master document 106. The diagram 500 is similar to the diagram 400 shown in FIG. 4, except that the diagram 500 shows a preview of the master document 106 if the editor accepts the suggested edit 1254 shown in FIG. 4. In particular, the diagram 500 includes the action preview region 540 that indicates that the editor 108 has selected to preview an acceptance of the suggested edit 1254. In the display of the document of the diagram 500, the box surrounding the added text within the suggested edit 1254 has been replaced with two preview indicators 502 and 504, which provide an indication to the editor 108 that the text between the preview indicators 502 and 504 is part of the suggested edit 1254. In some embodiments, one or both of the preview indicators 502 and 504 are displayed to provide an indication of the updated text. In other embodiments, neither of the preview indicators 502 and 504 is displayed, such that the display of the document 106 includes simply the clean view of the suggested edit to the document 106.

FIG. 6 is an exemplary diagram 600 of a display of an editor interface 110 for an editor interacting with the master document 106. The diagram 600 is similar to the diagram 500 shown in FIG. 5, except that the diagram 600 shows a preview of what the master document 106 would look like if the editor rejects the suggested edit 1254 shown in FIG. 4. In particular, the diagram 600 includes the action preview region 640 that indicates that the editor 108 has selected to preview a rejection of the suggested edit 1254. In the display of the document of the diagram 600, the box surrounding the added text within the suggested edit 1254 (from FIG. 4) has been replaced with a preview indicator 606, which provide an indication to the editor 108 that the text suggested to be added has been removed in the preview. In some embodiments, the preview indicator 606 is not shown in the preview of the master document 106.

As shown in FIGS. 4, 5, and 6, an editor 108 may select an option in an action preview region 440, 540, or 640 to indicate a desire to preview a result of an anticipated editor action on a suggested edit. The editor 108 selects the option by providing a user input such as using a mouse cursor to select the "preview accept" option or the "preview reject" option. In general, the editor 108 may provide the user input indicating a desire to preview a result of the anticipated editor action in any other way, such as using a touch screen, selecting one or more predetermined key strokes, hovering over a button (as shown in FIGS. 7 and 8), or any other suitable technique of providing a user input. In an example, when the editor interface 110 includes a touch screen, the editor's desire to preview an acceptance of a suggested edit may be indicated by the editor providing a first touch gesture (such as a flick of a finger in one direction), while the editor may provide a second touch gesture (such as a flick of a finger in another direction) to indicate a desire to preview a rejection of the suggested edit. The first touch gesture and the second touch gesture may both originate in a region corresponding to the suggested edit. In another example, the editor may tap and hold different regions of an area on the touch screen corresponding to the suggested edit to preview the acceptance or rejection of the suggested edit. The preview may be displayed until the editor releases the hold on the touch screen. In another example, when the editor interface 110 includes a keyboard, the editor may use keystrokes to parse through the suggested edits in a document (such as by using the arrow keys, for example). Using keystrokes may be desirable for an editor who prefers to use a keyboard input over using a mouse input. In this case, certain keystrokes may be reserved for accepting or rejecting a current suggested edit (such as by using the keystrokes for "a" or "y" for acceptance and "r" or "n" for rejection, for example). To display previews of the acceptance or rejection of a suggested edit, the editor 108 may provide a preview accept keystroke or a preview reject keystroke. In an example, the preview keystroke may be adjacent to the keystrokes reserved for accepting or rejecting.

FIGS. 7 and 8 are exemplary diagrams 700 and 800, respectively, of a display of an editor interface 110 for an editor interacting with the master document 106. The diagrams 700 and 800 are similar to the diagrams 500 and 600, respectively, except that the diagrams 700 and 800 include an action region 730 instead of an action preview region 540 and 640. In particular, the action region 730 corresponds to the suggested edit 1254 and is a prompt for the editor 108 to perform an action (i.e., make a selection to accept or reject the corresponding suggested edit). When the editor 108 provides a user input (in the form of selecting one of the options in the action region 730, such as by providing a click of a mouse button on the "accept" or "reject" regions of the action region 730), the display of the document is updated to reflect the selection made by the editor 108. However, before the editor 108 makes such a selection, the editor 108 may control a mouse cursor to hover over the "accept" region (as shown in FIG. 7) or over the "reject" region (as shown in FIG. 8) of the action region 730. The editor interface 110 detects the hovering of the mouse cursor over one of these regions and interprets the hovering to be a user input indicative of a desire to preview the anticipated acceptance or rejection. In particular, as shown in FIG. 7, the mouse cursor is shown as hovering over the accept region of the action region 730, and the preview indicators 502 and 504 are shown in the display of the document, similar to the display of the document shown in FIG. 5. In another example, as shown in FIG. 8, the mouse cursor is shown as hovering over the reject region of the action region 730, and the preview indicator 606 is shown in the display of the document, similar to the display of the document shown in FIG. 6. If the editor 108 controls the mouse cursor to move the cursor away from the "accept" or "reject" regions, without selecting one of the regions (by providing a mouse click, for example), the preview indicators are removed from the display of the document, and the display of the document returns to that shown in FIG. 4. In general, the editor 108 may control the mouse cursor to move the cursor to hover over either of the "accept" or "reject" regions any number of times before making a selection.

FIG. 9 is an exemplary diagram 900 of a display of an editor interface 110 for an editor interacting with the master document 106 that includes an edit incorporated into a suggested edit. The diagram 900 is similar to the diagram 700, except that the diagram 900 includes a second suggested edit made by the Editor C. The diagram 900 includes a portion of an original document 106 with a suggested edit made by Reviewer A and a change to the suggested edit, where the change is made by Editor C. The suggested edit corresponds to the suggested edit 1254 made by Reviewer A and includes the addition of a portion of a sentence to the document. The change made by Editor C corresponds to the suggested edit 1345 and is the addition of "n electronic" to the portion suggested to be added by Reviewer A. Because the edit 1345 is made by an editor and is with respect to a suggested edit 1254 made by a reviewer, the edit 1345 may be referred to as a privileged edit and is incorporated into the suggested edit 1254. As shown in FIGS. 4-8, the diagram 900 includes a sidebar on the right hand side of the editor interface 110 for displaying metadata associated with the suggested edit. In particular, the sidebar includes a metadata region 924 associated with the suggested edit made by Reviewer A. The metadata region 924 includes data indicative of which user made the suggested edit (i.e., Reviewer A), the edit type corresponding to the suggested edit (i.e., an addition), the time and date the suggested edit was made (i.e., 10:00 AM today), and an indication of the object to be added (i.e., "During development of a document,"). The diagram 900 further includes another metadata region 928 associated with the suggested edit 1345. The metadata region 928 indicates that the suggested edit 1345 includes the addition of a phrase "n electronic" and was made by Editor C. The metadata region 928 further includes an indication of the date and time that Editor C made the suggested edit 1345.

When Editor C makes the suggested edit 1345, the review manager 102 determines that the suggested edit 1345 depends on (or equivalently, has a compounding relationship with) the suggested edit 1254. In particular, the review manager 102 determines that acceptance of the suggested edit 1345 depends on the acceptance of the suggested edit 1254. The review manager 102 further determines that the suggested edit 1254 was made by a reviewer and the suggested edit 1345 was made by an editor, who has greater privileges with respect to the document 106 than the reviewer. Upon determining that the suggested edits have a compounding relationship and that the user who made the later suggested edit has greater privileges than the user who made the earlier suggested edit, the review manager 102 identifies the edit 1345 as a privileged edit and incorporates the later edit (edit 1345) with the earlier edit (edit 1254). This is shown in the editor interface 110 by the inclusion of the metadata region 928 within the metadata region 924. Thus, the suggested edit 1345 is incorporated into the suggested edit 1254, and the sidebar region of FIG. 9 displays an annotation of the incorporation.

When Reviewer A makes the suggested edit 1254 and when Editor C makes the suggested edit 1345, the review manager 102 may receive data indicative of the suggested edits 1254 and 1345 over the network 101 and may accordingly update the list of suggestions 105. Furthermore, the data structure 118 shown in FIG. 3 may also be updated as new suggested edits are received over the network 101.

As shown in the diagram 900, the editor has controlled the mouse cursor to hover over the "accept" region of the action region 730, indicating a desire to preview an acceptance of the suggested edit made by Reviewer A. Because the edit 1345 made by the editor is incorporated into the suggested edit 1254 made by the reviewer, the preview display of the document includes a visual rendering of the document including acceptances of both edits 1254 and 1345, as shown by preview indicators 902 and 904. Thus, even though the editor has only explicitly indicated a desire to preview an acceptance of the suggested edit 1254, acceptances of both edits 1254 and 1345 are shown in the preview because the suggested edit 1254 would not be accepted without acceptance of the edit 1345. As shown in FIG. 9, only two levels of edits are shown. However, in general, any number of levels of edits may be used to determine which edits to show in a preview. In an example, if a second editor were to make a change to the edit 1345 made by Editor C, the change made by the second editor would also be incorporated with the suggested edit 1254 and would be shown in the display during a preview of an acceptance of the suggested edit 1254. In an example, other relationships may be considered in generating the preview, such as conflicting relationships. In particular, the preview may further include a rejection of any suggested edits that have a conflicting relationship with the suggested edit 1254.

Furthermore, if the editor were to control the mouse cursor to hover over the "reject" region of the action region 730, a preview of a rejection of the suggested edit 1254 would be displayed in the display of the document. In this case, the preview would include a rejection of both the suggested edit 1254 and the suggested edit 1345 because rejection of the suggested edit 1254 causes an automatic rejection of the suggested edit 1345.

FIGS. 10 and 11 are exemplary diagrams 1000 and 1100, respectively, of a display of an editor interface 110 for an editor interacting with the master document 106 that includes a suggested format change. Displaying an indication of a format change such as a change to a column width of a table may be difficult to provide in a redline or markup view of the document, because it may be challenging to display a rendering of the original version of the document as well as the format change simultaneously. Thus, providing a preview of an acceptance or a rejection of the suggested change is especially advantageous for allowing an editor 108 to visualize suggested format changes to a document. The diagrams 1000 and 1100 indicate that Reviewer A has suggested a change to a column width of a table in the document and each include an action region 1030 that allows the editor 108 to select to accept or reject the suggested change. The diagram 1100 provides the display of the document when the editor 108 controls a mouse cursor to hover over a "reject" region of the action region 1030 and indicates that the original version of the table has a second column that is wider than a first column. The diagram 1000 shows the display of the document when the editor 108 controls a mouse cursor to hover over an "accept" region of the action region 1030 and indicates the preview of the new version of the table if the suggested change is accepted. As shown in the diagram 1000, hovering over the "accept" region allows for the editor 108 to easily view the suggested change, which shows that Reviewer A has suggested changing the width of the second column to be similar to the width of the first column. As shown in FIGS. 10 and 11, a suggested change includes an update to a width of a column in a table. However, in general, one of ordinary skill in the art will understand that the systems and methods described herein are applicable to suggested changes of any type, including other types of format changes such as changes in page size, tab stops, line spacing, alignment, textual format changes such as changing a font, size, or emphasis, any changes to a table, or any other suitable types of changes to a document.

FIG. 12 is an illustrative diagram 1200 of a view of the editor interface 110 when an editor 108 interacts with the document 106, according to an illustrative embodiment. In particular, in the diagram 800, the editor 108 has selected to display the editor display options by selecting the editor display options button 334. When the editor display options button 334 is selected, the sidebar of the editor interface 110 includes a display box 654. In particular, the display box 654 includes a list of display options, and decision options (i.e., reject options 650 and accept options 652) for the editor 108.

In particular, the display box 654 allows the editor 108 to selectively view a subset of all the suggested edits related to the document 106 in a markup view of the document. For example, before selecting to preview an editor's action on any of the suggested edits, the editor 108 may first select to display only the suggested edits corresponding to a particular reviewer, or corresponding to a particular type of suggested edit. In this case, the editor 108 would select and deselect the appropriate set of options under the display options in the display box 654. When the editor 108 selects and deselects the display options, the view of the display of the document may be updated in real time. As shown, the editor 108 has selected to view the option corresponding to everyone's activity. Upon selecting this option, each box next to a reviewer or editor's identifier (i.e., Reviewer A, Reviewer B, and Editor C) may be automatically selected, and all the suggested edits may be shown in the display. The numbers following the user identifiers correspond to a number of pending suggestions remaining from the reviewer. For example, Reviewer A has five pending suggested edits, Reviewer B has two pending suggested edits, and Editor C has two pending suggested edits. The review manager 102 may appropriately update these numbers as the editor 108 accepts or rejects the suggested edits in the document 106.

The display box 654 also allows the editor 108 to selectively view a subset of the suggested edits corresponding to an edit type. The editor 108 may select and deselect the appropriate set of options to display the edits corresponding to one or more desired edit types. As shown, the editor 108 has selected to view all edits, corresponding to comments, additions, deletions, spelling corrections, and formatting changes. In this case, all the edits, regardless of edit type are shown in the display. The review manager may use the data structure shown in FIG. 3 to easily determine the subset of suggested edits to display in the view of the document.

In addition, the display box 654 includes two options corresponding to reject options 650 and accept options 652. The options 650 and 652 allow the editor 108 to accept or reject a current edit, which may correspond to a suggested edit in the document 106 and may be highlighted in the document with color, a pointer, or any other suitable way of pointing out an edit in a document. In addition, the options 650 and 652 also allow the editor 108 to accept or reject all visible edits (i.e., corresponding to those edits selected to be displayed under the display options). In particular, it may be desirable for the editor 108 to accept or reject all suggested edits corresponding to a particular reviewer (i.e., Reviewer A). In this case, the editor 108 may select to display only those edits corresponding to Reviewer A, and may select the option 650 to reject all the displayed suggested edits. Alternatively, the editor 108 may select the option 652 to accept all the suggested edits from Reviewer A. Before rejecting or accepting the edits, a preview of the document taking into account the anticipated editor's action is provided when the editor controls the mouse cursor to hover over the "accept all visible" option, as shown in FIG. 12. Providing the preview in this way allows for the editor 108 to view a rendering of the document that incorporates Reviewer A's multiple changes before determining whether to reject or to accept the edits.

It may be desirable for the editor 108 to accept or reject all suggested edits corresponding to a particular edit type. In particular, parsing through each suggested edit may be time consuming, especially when the suggested edits include fixes to spelling mistakes, format changes, or any other minor suggested edits. Thus, the editor 108 may select to display only those edits corresponding to one or more edit types (i.e., spelling mistakes and formatting changes, or the "non-substantive" suggested edits), preview the changes by hovering over the the appropriate region, and select the option 652 to accept all visible edits. Then, the editor 108 may parse through the remainder of the edits (i.e., the "substantive" suggested edits) for individual consideration. These options, which allow the editor 108 to efficiently accept or reject edits corresponding to one or more reviewers or one or more edit types, allow for changes to be made to the document 106 efficiently.

The display box 654 is shown for illustrative purposes only, and one of ordinary skill in the art will appreciate that any subset of the components shown may be combined with any other sort of data related to the document 106 for display.

FIG. 13 is an illustrative flow diagram of a method 1300 used by an editor interface 110 to manage a display of a document 106. The method 1300 includes the steps of receiving a first suggested edit from a reviewer (step 1302), displaying the first suggested edit to an editor (step 1304), and receiving an input from the editor to preview an editor's action (step 1306). If the preview request is for an acceptance (decision block 1308), the editor interface 110 displays a preview of the acceptance (step 1310), and if the editor provides user input indicating to accept the first suggested edit (decision block 1312), then the first suggested edit is accepted by the review manager 102 (step 1314). Alternatively, if the preview request is for a rejection (decision block 1316), the editor interface 110 displays a preview of the rejection (step 1318), and if the editor provides user input indicating to reject the first suggested edit (decision block 1320), then the first suggested edit is rejected by the review manager 102 (step 1322).

At step 1302, a first suggested edit from a reviewer is received. The reviewer 112 has access to view and make suggested edits and comments to the electronic document. As described in relation to FIG. 1, the reviewer 112 views the document over the reviewer interface 114 and makes a change to the document. The change is the first suggested edit and may be an insertion, deletion, replacement, move, format change, or any other suitable change in a document. Data indicative of the change is sent over the network 101 to the review manager 102, which may maintain a list of suggested changes that are associated with the document.

At step 1304, the first suggested edit is displayed to an editor. For example, the editor 108 may interact with the document over an editor interface 110, which may include a display unit that displays a view of the document to the editor. The displayed view of the document includes an indication of the first suggested edit, such as the suggested edit 1254 as shown and described in relation to FIGS. 4-9. One purpose of displaying the first suggested edit to the editor is so that the editor may perform an editor action on the first suggested edit. In particular, an editor action is an acceptance or a rejection of the first suggested edit. In some implementations, when the first suggested edit is displayed over the editor interface 110 to the editor 108, an action region such as the action regions 730 and 1030 shown in FIGS. 7-11 is displayed on the editor interface 110. The action region may include an accept region, a reject region, or both, such that the editor 108 may select the accept region to accept the first suggested edit or select the reject region to reject the first suggested edit.

At step 1306, an input is received from the editor to preview an editor's action. As shown and described in relation to FIGS. 7-11, the receiving the input from the editor may include detecting a cursor hovering over the action region or the reject region of the action region. In some implementations, an action preview region such as action preview region 440, 540, or 640 is displayed over the editor interface 110. In this case, the editor 108 may provide the input indicative of a desire to preview the editor's action by selecting an option in the action preview region, such as by using a mouse cursor to select a "preview accept" option or a "preview rejection" option. In general, the input received from the editor to preview the editor's action may include any form of input, such as by using a touch screen (by detecting touch gestures such as a finger swipe or a tap-and-hold gesture, for example), selecting one or more predetermined key strokes, hovering over a button, or any other suitable technique of providing a user input.

At decision block 1308, it is determined whether the preview request is for an acceptance. That is, the user input received at step 1306 is evaluated to determine whether the user input received over the editor interface 110 is associated with an acceptance of the first suggested edit. If so, the method 1300 proceeds to step 1310 to display a preview of the acceptance over the editor interface 110. As depicted in FIGS. 5, 7, 9, and 10 the preview includes a visual rendering of the document with an anticipated acceptance of the first suggested edit being incorporated into the document. As described herein, the preview may be generated by the editor interface 110, such that no data is transmitted over the network 101 regarding the editor's input indicative of a desire to preview the acceptance of the first suggested edit. In this case, the editor's user device is configured to generate the visual rendering of the document that includes incorporation of the anticipated acceptance of the first suggested edit. In another example, the preview may be generated by the server 104. In this case, when the input from the editor indicative of a desire to preview the acceptance is detected, data indicative of the desire is transmitted over the network 101 to the server 104, which generates a rendering of the document incorporating the anticipated acceptance of the first suggested edit. The rendering is transmitted back over the network 101 to the editor's user device 113c, which displays the visual rendering to the editor 108.

In some implementations, the preview does not include updates to other suggested edits that are still pending. In this case, other pending suggested edits are displayed in markup form when the preview is displayed, such that a remainder of the view of the document (other than that associated with the first suggested edit) remains unchanged before and after the editor 108 provides the input at step 1306. This may be desirable if it is desirable to keep most of the visual display unchanged, such that the only changes that are made to the visual display are those associated with the first suggested edit. In some implementations, one or more acceptances of other suggested edits that are incorporated with the first suggested edit, as described in relation to FIG. 9, may also be incorporated into the visual rendering of the preview display. In some implementations, one or more rejections of any other suggested edits that are conflicting with the first suggested edit may be also incorporated into the visual rendering of the preview display. The editor interface 110 may include one or more editor options, where the editor 108 may provide user input indicative of whether the preview display should include changes to other pending suggested edits or not, and the editor 108 may specify what types of other changes to incorporated into the preview display.

At decision block 1312, it is determined whether the editor 108 provides user input indicating to accept the first suggested edit. For example, the editor 108 may select the accept region of an action region, or may provide some other user input indicative of a desire to accept the first suggested edit. If so, the method 1300 proceeds to step 1314 to accept the first suggested edit by the review manager 102, which may update a list of suggestions 105 to indicate that the first suggested edit is accepted (by changing the status of the first suggested edit from pending to accepted, for example) and by incorporating the acceptance of the first suggested edit into a clean view of the document.

Alternatively, if it is determined at decision block 1316 that the preview request is for a rejection, the editor interface 110 displays a preview of the rejection at step 1318. That is, the user input received at step 1306 is evaluated to determine whether the user input received over the editor interface 110 is associated with a rejection of the first suggested edit. Example displays of a preview including a rejection of a suggested edit are shown in FIGS. 6, 8, and 11. If at decision block 1320 the editor provides user input indicating to reject the first suggested edit, then the method proceeds to step 1322 to reject the first suggested edit by the review manager 102. For example, the editor 108 may select the reject region of an action region, or may provide some other user input indicative of a desire to reject the first suggested edit. The review manager 102 may update the list of suggestions 105 to indicate that the first suggested edit is rejected (by changing the status of the first suggested edit from pending to rejected, for example), and by removing an indication of the first suggested edit from a markup view of the document that is displayed to reviewers and/or editors.

The order of the steps and decision blocks as shown in FIG. 13 are for illustrative purposes only and one of ordinary skill in the art will understand that any suitable order may be used. In particular, as shown as depicted in FIG. 13, the editor interface 110 determines whether the preview request is for an acceptance before determining whether the preview request is for a rejection. In general, the editor interface 110 may directly proceed to step 1318 to display a preview of the rejection upon recognition that the preview request is not for an acceptance at decision block 1308. Furthermore, indications of suggested edits that have compounding or conflicting relationships with the first suggested edit are not described in relation to FIG. 13, but in general, as described in relation to FIG. 9, receiving a preview request from an editor regarding the first suggested edit may cause generation of a preview display involving multiple suggested edits if the first suggested edit has a relationship with one or more other edits.

FIG. 14 is a flowchart of a method 1400 used by the editor interface 110 to provide a preview of an editor's action to an electronic document. The method 1400 includes the steps of displaying an edit to an electronic document, the edit being provided by a first user (step 1402), detecting a user input from a second user, the user input being indicative of a desire to preview a result of an editor action on the edit (step 1404), and providing a preview of the result of the editor action in response to detecting the user input (step 1406).

At step 1402, the editor interface 110 displays an edit to the electronic document, where the edit is provided by a first user of the electronic document. The edit is a suggested edit that is made by a user who has reviewing privileges with respect to the document, or an editor who is operating in a reviewing mode to provide suggested edits to the document. As described herein, the edit may be any kind of edit, such as changes to text portions of the document, such as those shown in FIGS. 4-9, formatting changes to a table, such as those shown in FIGS. 10 and 11, or any other suitable type of edit, such as font changes, additions, deletions, substitutions, spelling changes, formatting changes, or any suitable combination thereof.

At step 1404, the editor interface 110 detects a user input from a second user of the electronic document, where the user input is indicative of a desire to preview a result of the editor action on the edit. The second user is a user who has editing privileges with respect to the electronic document, such as an editor, and the editor action is an action that the editor may take with respect to the suggested edit, such as accepting or rejecting the suggested edit. The first user (i.e., the reviewer) and the second user (i.e., the editor) may simultaneously access different views of the electronic document over the network 101, and the different views of the electronic document may be associated with the reviewer privileges or the editor privileges for each user. In particular, the view of the document displayed over the reviewer interface 114 may include the suggested changes to the document. However, the reviewer interface 114 would not include editor action regions, such as action region 440 shown in FIG. 4, for example, as is shown in the editor interface 110. In some implementations, detecting the user input includes detecting a mouse cursor hovering over an action region of a display of the electronic document, such as that shown in FIGS. 7-11. In some implementations, detecting the user input comprises detecting a selection of a preview region of a display of the electronic document, and the preview region is associated with a preview of the editor action, such as that shown in FIGS. 4-6.

At step 1406, the editor interface 110 provides a preview of the result of the editor action in response to detecting the user input. In an example, providing the preview comprises temporarily applying the editor action to a visual rendering of the electronic document. Furthermore, the preview may include temporarily displaying an indication of the preview mode in a visual rendering of the electronic document over the editor interface 110. For example, the indication of the preview mode may include the preview indicators as shown in FIGS. 5-9. In some implementations, providing the preview occurs before the second user performs the editor action. In particular, the editor interface 110 may detect another user input from the second user, the other user input being indicative of a desire to perform the editor action on the edit. In response to detecting the editor action, the editor interface 110 transmits a signal over the network 101 to review manager 102 to update the electronic document to reflect the editor action.

In some implementations, the edit displayed at step 1402 is hidden from a view of a published view of the document. In particular, a third type of user may have view-only privileges with respect to the electronic document, and the view-only user may only have access to a published view of the electronic document. In this case, the view-only user may not be able to view any pending suggested edits to the document that have not yet been accepted by the editor. When the review manager 102 updates the electronic document 106 to reflect accepted edits, the published view of the electronic document may be updated in real time to reflect these changes.

Figure 15:
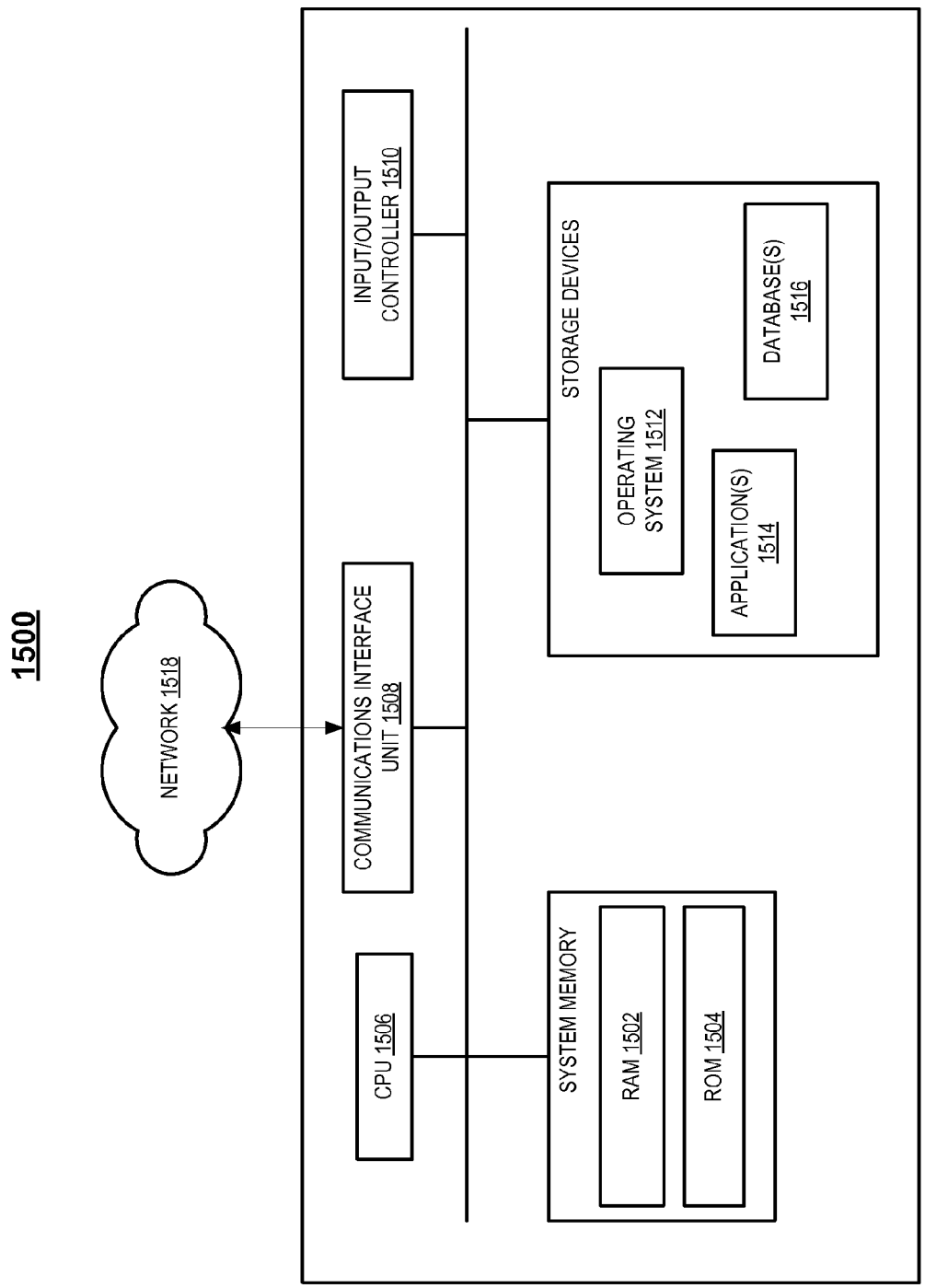
FIG. 15 is a block diagram of a computing device for performing any of the processes described herein, according to an illustrative embodiment.

FIG. 15 is a block diagram of a computing device, such as any of the components of the system of FIG. 1, for performing any of the processes described herein. Each of the components of these systems may be implemented on one or more computing devices 1500. In certain aspects, a plurality of the components of these systems may be included within one computing device 1500. In certain implementations, a component and a storage device may be implemented across several computing devices 1500.

The computing device 1500 comprises at least one communications interface unit, an input/output controller 1510, system memory, and one or more data storage devices. The system memory includes at least one random access memory (RAM 1502) and at least one read-only memory (ROM 1504). All of these elements are in communication with a central processing unit (CPU 1506) to facilitate the operation of the computing device 1500. The computing device 1500 may be configured in many different ways. For example, the computing device 1500 may be a conventional standalone computer or alternatively, the functions of computing device 1500 may be distributed across multiple computer systems and architectures. In FIG. 15, the computing device 1500 is linked, via network or local network, to other servers or systems.

The computing device 1500 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 1508 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 1506 comprises a processor, such as one or more conventional microprocessors and one or more supplementary co-processors such as math co-processors for offloading workload from the CPU 1506. The CPU 1506 is in communication with the communications interface unit 1508 and the input/output controller 1510, through which the CPU 1506 communicates with other devices such as other servers, user terminals, or devices. The communications interface unit 1508 and the input/output controller 1510 may include multiple communication channels for simultaneous communication with, for example, other processors, servers or client terminals.

The CPU 1506 is also in communication with the data storage device. The data storage device may comprise an appropriate combination of magnetic, optical or semiconductor memory, and may include, for example, RAM 1502, ROM 1504, flash drive, an optical disc such as a compact disc or a hard disk or drive. The CPU 1506 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 1506 may be connected to the data storage device via the communications interface unit 1508. The CPU 1506 may be configured to perform one or more particular processing functions.

The data storage device may store, for example, (i) an operating system 1512 for the computing device 1500; (ii) one or more applications 1514 (e.g., computer program code or a computer program product) adapted to direct the CPU 1506 in accordance with the systems and methods described here, and particularly in accordance with the processes described in detail with regard to the CPU 1506; or (iii) database(s) 1516 adapted to store information that may be utilized to store information required by the program.

The operating system 1512 and applications 1514 may be stored, for example, in a compressed, an uncompiled and an encrypted format, and may include computer program code. The instructions of the program may be read into a main memory of the processor from a computer-readable medium other than the data storage device, such as from the ROM 1504 or from the RAM 1502. While execution of sequences of instructions in the program causes the CPU 1506 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to any of the processes described herein. The program also may include program elements such as an operating system 1512, a database management system and "device drivers" that allow the processor to interface with computer peripheral devices (e.g., a video display, a keyboard, a computer mouse, etc.) via the input/output controller 1510.

The term "computer-readable medium" as used herein refers to any non-transitory medium that provides or participates in providing instructions to the processor of the computing device 1500 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 1506 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 1500 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

What is claimed is:

1. A method for providing a preview of an editor action related to a first edit of an electronic document, the method comprising:
    displaying, by a user interface, the first edit and a second edit to the electronic document in a markup view of the electronic document, wherein the first edit and the second edit are provided by a first user of the electronic document;
    detecting, by a processor, a user input from a second user of the electronic document, the user input being indicative of a desire to preview a result of the editor action on the first edit;
    providing, by the processor, a preview of the result of the editor action in response to detecting the user input by temporarily applying the editor action to a visual rendering of the electronic document without changing a remainder of the markup view of the electronic document related to the second edit, wherein:
    the preview is provided until the editor action is received or until the second user provides another user input indicative of a request to stop viewing the preview, providing the preview occurs before the second user performs the editor action, the preview includes (1) a replacement of the markup view of a first portion of the electronic document related to the first edit with a clean view of the first portion of the electronic document related to the first edit and (2) the markup view of a second portion of the electronic document related to the second edit, and the clean view of the first portion of the electronic document is displayed in the preview as if the editor action is implemented on the first edit.

2. The method of claim 1, wherein the first edit is a suggested edit to the electronic document, the editor action is an acceptance or a rejection of the suggested edit, the markup view of the electronic document that is provided before the user input is detected includes the markup view of the first portion and the markup view of the second portion, and the markup view of the second portion is unchanged in the preview.

3. The method of claim 1, wherein providing the preview comprises temporarily displaying at least one preview indicator that is indicative of a preview mode in a visual rendering of the electronic document, and the at least one preview indicator refers to the clean view of the first portion that replaces the markup view of the first portion.

4. The method of claim 1, wherein:
    the first edit and the second edit are suggested changes,
    the first user has reviewer privileges associated with the electronic document that (1)allow the first user to make the suggested changes to the document and (2) prohibit the first user from accepting or rejecting the suggested changes, and
    the second user has editor privileges associated with the electronic document that (1) allow the second user to accept or reject the suggested changes and (2) allow the second user to make direct changes to the document that do not require acceptance before being implemented in the clean view and the markup view.

5. The method of claim 4, wherein:
    the first user accesses the markup view at the same time that the second user accesses the markup view of the electronic document,
    the markup view that is provided to the first user allows the first user to make the suggested changes to the document and prohibits the first user from accepting or rejecting the suggested changes,
    the markup view that is provided to the second user allows the second user to accept or reject the suggested changes, and
    the markup view that is provided to the first user and the markup view that is provided to the second user are updated in real time to reflect the editor action on the first edit after the second user performs the editor action.

6. The method of claim 1, further comprising:
    detecting, by the processor, another user input from the second user, the other user input being indicative of a desire to perform the editor action on the first edit; and
    updating, in response to detecting the other user input, the electronic document to reflect implementation of the editor action without changing a remainder of the markup view of the document including the markup view of the second portion.

7. The method of claim 1, further comprising:
    hiding the first edit from a view of a published view of the electronic document until performance of the editor action is detected, wherein the editor action is an acceptance of the first edit; and
    when the performance of the editor action is detected, updating the published view of the document to reflect the first edit.

8. The method of claim 1, wherein detecting the user input comprises detecting a mouse cursor hovering over an action region of a display of the electronic document, and the action region is associated with the editor action and is specific to the first edit.

9. The method of claim 1, wherein detecting the user input comprises detecting a selection of a preview region of a display of the electronic document, and the preview region is associated with a preview of the editor action and is specific to the first edit.

10. The method of claim 1, further comprising:
    displaying, by the user interface, a third edit to the electronic document in the markup view of the electronic document;
    identifying a relationship between the first edit and the third edit, wherein the relationship indicates that acceptance of the first edit is dependent on acceptance of the third edit, such that acceptance of the first edit automatically results in acceptance of the third edit, and the clean view of the first portion of the electronic document is displayed in the preview as if the editor action is implemented on the third edit.

11. A system for providing a preview of an editor action related to a first edit of an electronic document, comprising:
    a user interface configured to display the first edit and a second edit to the electronic document in a markup view of the electronic document, wherein the first edit and the second edit are provided by a first user of the electronic document; and a processor configured to detect a user input from a second user of the electronic document, the user input being indicative of a desire to preview a result of the editor action on the first edit, and provide a preview of the result of the editor action in response to detecting the user input by temporarily applying the editor action to a visual rendering of the electronic document without changing a remainder of the markup view of the electronic document related to the second edit, wherein:

the preview is provided until the editor action is received or until the second user provides another user input indicative of a request to stop viewing the preview, providing the preview occurs before the second user performs the editor action, the preview includes (1) a replacement of the markup view of a first portion of the electronic document related to the first edit with a clean view of the first portion of the electronic document related to the first edit and (2) the markup view of a second portion of the electronic document related to the second edit, and the clean view of the first portion of the electronic document is displayed in the preview as if the editor action is implemented on the first edit.

12. The system of claim 11, wherein the first edit is a suggested edit to the electronic document, the editor action is an acceptance or a rejection of the suggested edit, the markup view of the electronic document that is provided before the user input is detected includes the markup view of the first portion and the markup view of the second portion, and the markup view of the second portion is unchanged in the preview.

13. The system of claim 11, wherein the processor provides the preview by temporarily displaying at least one preview indicator that is indicative of a preview mode in a visual rendering of the electronic document, and the at least one preview indicator refers to the clean view of the first portion that replaces the markup view of the first portion.

14. The system of claim 11, wherein:
the first edit and the second edit are suggested changes,
the first user has reviewer privileges associated with the electronic document that (1) allow the first user to make the suggested changes to the document and (2) prohibit the first user from accepting or rejecting the suggested changes, and
the second user has editor privileges associated with the electronic document that (1) allow the second user to accept or reject the suggested changes and (2) allow the second user to make direct changes to the document that do not require acceptance before being implemented in the clean view and the markup view.

15. The system of claim 14, wherein:
the first user accesses the markup view at the same time that the second user accesses the markup view of the electronic document, the markup view that is provided to the first user allows the first user to make the suggested changes to the document and prohibits the first user from accepting or rejecting the suggested changes, the markup view that is provided to the second user allows the second user to accept or reject the suggested changes, and the markup view that is provided to the first user and the markup view that is provided to the second user are updated in real time to reflect the editor action on the first edit after the second user performs the editor action.

16. The system of claim 11, wherein the processor is further configured to:
detect another user input from the second user, the other user input being indicative of a desire to perform the editor action on the first edit; and
update, in response to detecting the other user input, the electronic document to reflect implementation of the editor action without changing a remainder of the markup view of the document including the markup view of the second portion.

17. The system of claim 11, wherein the user interface is further configured to:
hide the first edit from a view of a published views of the electronic document until performance of the editor action is detected, wherein the editor action is an acceptance of the first edit; and
when the performance of the editor action is detected, update the published view of the document to reflect the first edit.

18. The system of claim 11, wherein the processor detects the user input by detecting a mouse cursor hovering over an action region of a display of the electronic document, and the action region is associated with the editor action and is specific to the first edit.

19. The system of claim 11, wherein the processor detects the user input by detecting a selection of a preview region of a display of the electronic document, and the preview region is associated with a preview of the editor action and is specific to the first edit.

20. The system of claim 11, wherein:
the user interface is further configured to display a third edit to the electronic document in the markup view of the electronic document;
identifying a relationship between the first edit and the third edit, wherein the relationship indicates that acceptance of the first edit is dependent on acceptance of the third edit, such that acceptance of the first edit automatically results in acceptance of the third edit, and the clean view of the first portion of the electronic document is displayed in the preview as if the editor action is implemented on the third edit.

* * * * *